May 5, 1970  R. C. STRANDBERG  3,510,632
DIGITAL STRETCH AND SPEED INDICATING APPARATUS
Filed Feb. 14, 1966  15 Sheets-Sheet 1

INVENTOR
ROBERT C. STRANDBERG
BY
Munson H. Lane
ATTORNEY

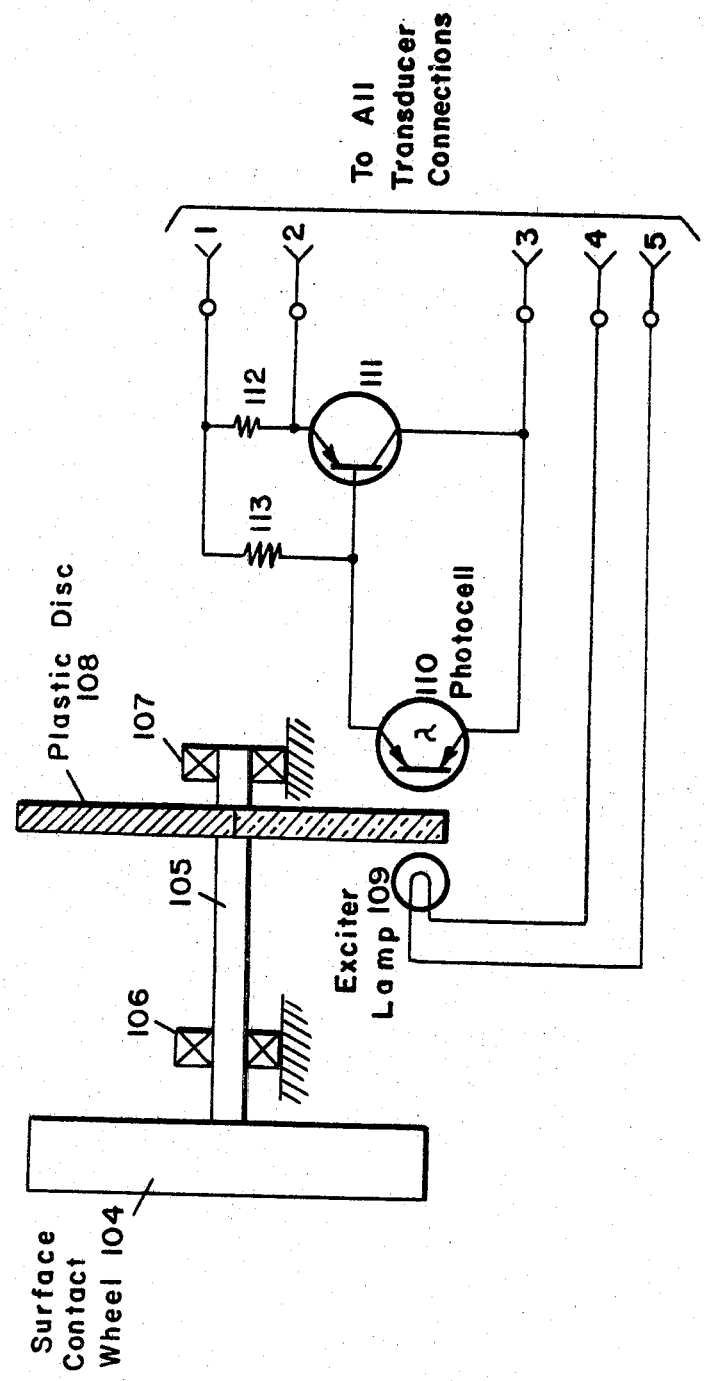

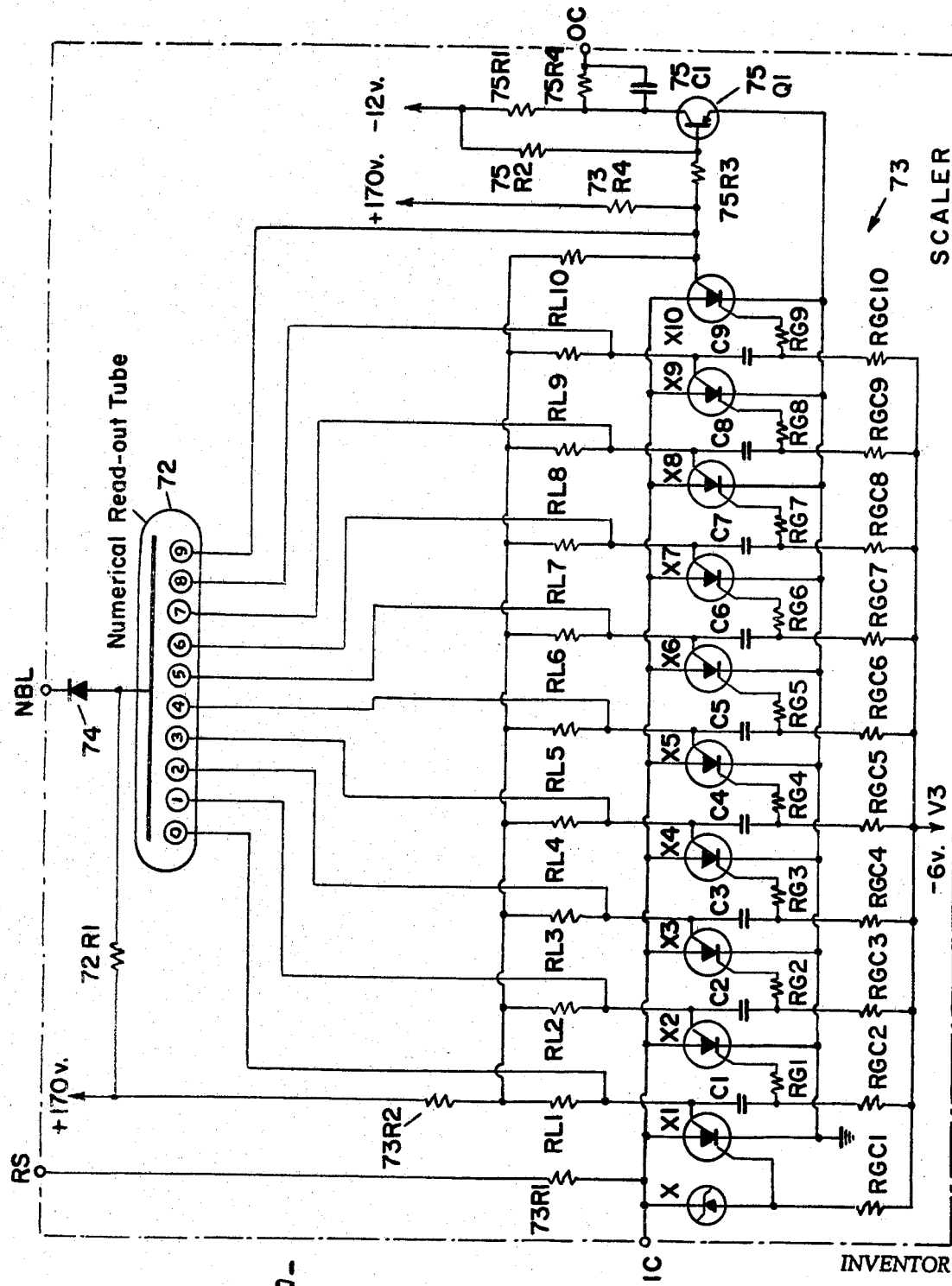

ROBERT C. STRANDBERG

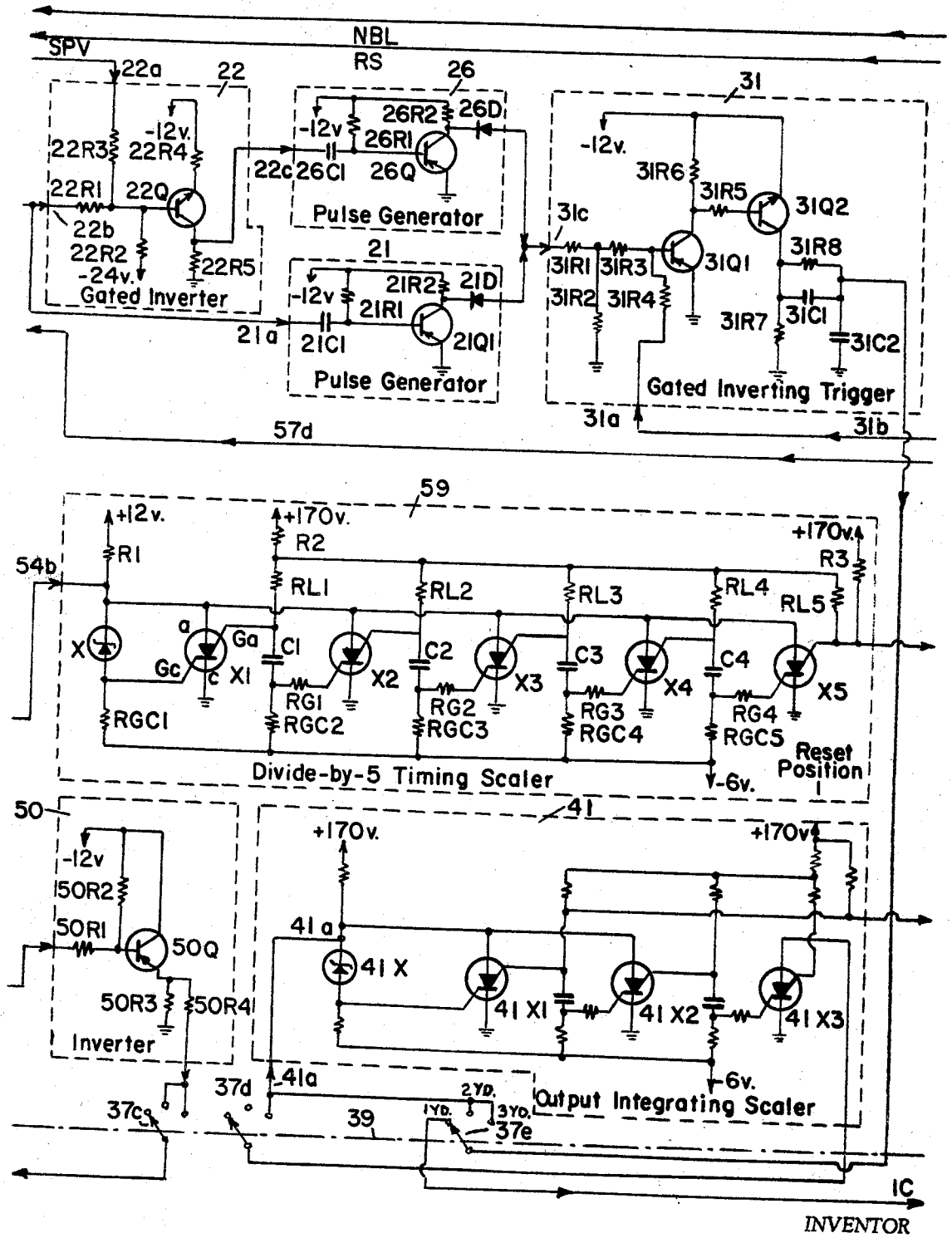
FIG-5G-

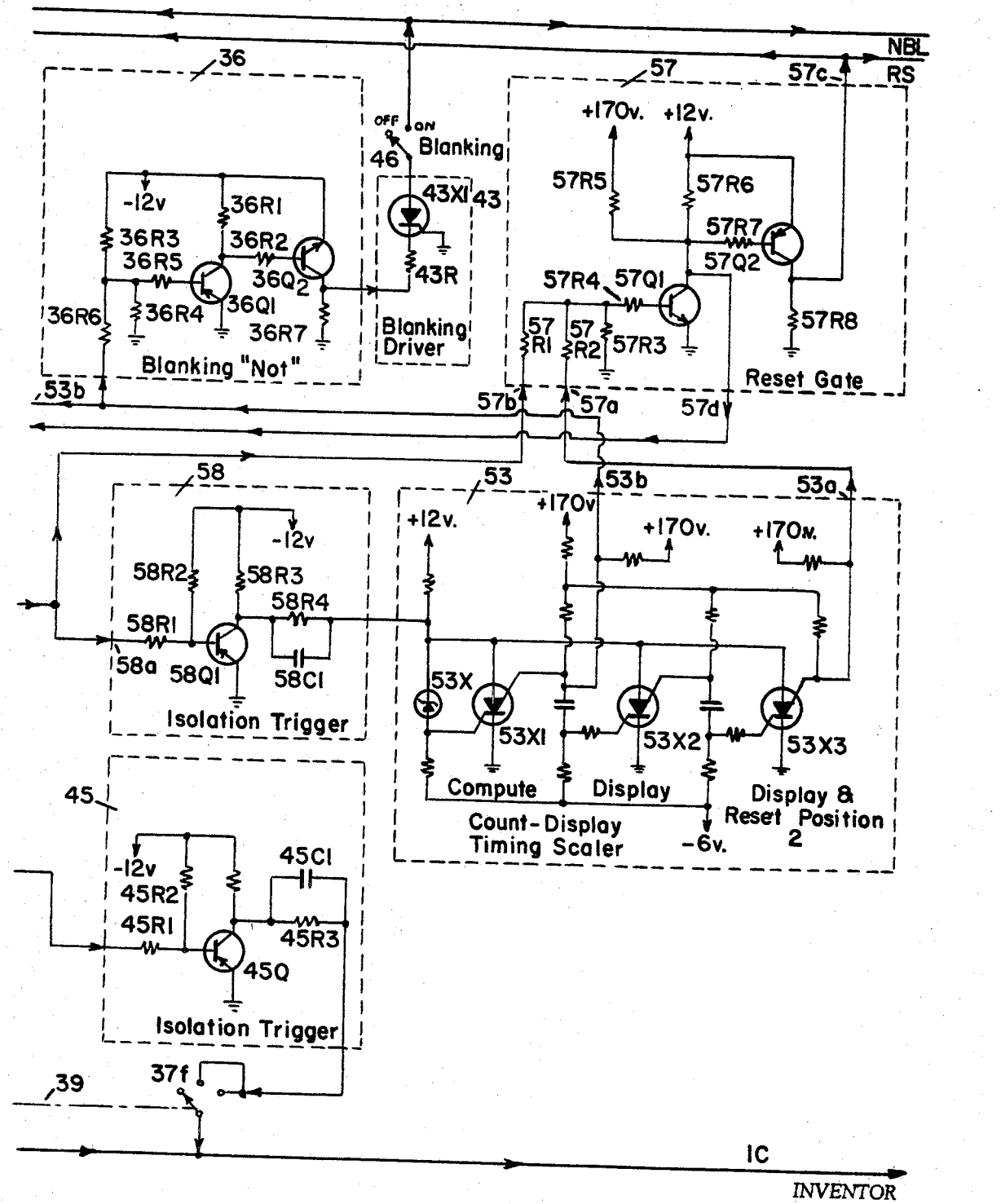

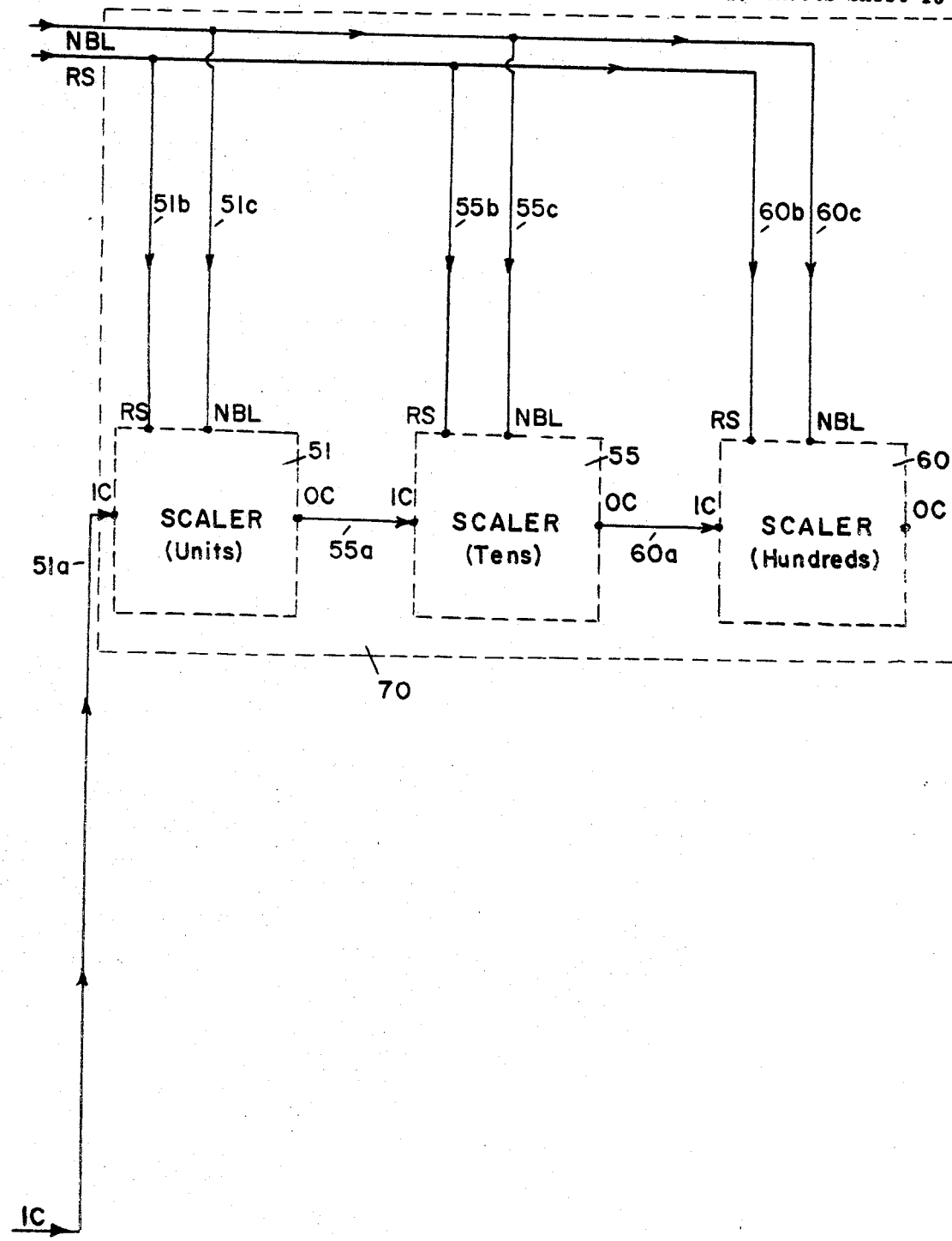

United States Patent Office 3,510,632
Patented May 5, 1970

3,510,632
DIGITAL STRETCH AND SPEED
INDICATING APPARATUS
Robert C. Strandberg, Greensboro, N.C., assignor to
Strandberg Engineering Laboratories, Inc., Greensboro,
N.C., a corporation of North Carolina
Filed Feb. 14, 1966, Ser. No. 527,230
Int. Cl. G04f 9/00; G06m 7/00
U.S. Cl. 235—92       17 Claims

ABSTRACT OF THE DISCLOSURE

A digital computer for computing the percent elongation of material being treated in a processing machine comprising: input pulse generating means for generating pulses corresponding to units of length of the material entering the processing machine, output pulse generating means for generating pulses corresponding to units of length of the material leaving the processing machine, a digital counter for counting the pulses from said output pulse generating means, said digital counter having reset means, a count gate means in circuit with said digital counter and said output pulse generating means for controlling the admission of pulses from said output pulse generating means to said digital counter, a reset gate in circuit with said digital counter for controlling the application of reset signals to said reset means, and cyclic timing means in circuit with said input pulse generating means and with said count gate and reset gate respectively, said timing means being controlled by the pulses from said input generator for opening and closing said count gate and said reset gate periodically to admit pulses from said output pulse generator to said digital counter through said count gate during a count accumulation period and to reset said digital counter at a predetermined period after said count accumulation period.

---

This invention relates to a digital computer. More particularly it relates to a digital computer for measuring and displaying in digital form the elongation of textile material due to processing and for alternately or cyclically measuring and displaying in digital form the speed of the material travelling through the processing machine.

It is an object of the invention to provide means for measuring and displaying in digital form the elongation in material resulting from processing.

It is an object of this invention to provide means for measuring and displaying in digital form the speed of the material travelling through the processing machine.

It is an object of this invention to provide means for manual or automatic selection of plural measuring points to facilitate use on multiple input or output machines.

It is an object of this invention to provide means for manual selection for measurement of either speed or percent stretch, means for automatically cycling between measurement and display of percent stretch and measurement and display of speed.

It is another object of this invention to provide means for automatically cycling the measuring apparatus from one input measuring point to the next of a plurality of measuring points while alternately indicating percent stretch and speed.

It is another object of this invention to provide means for visually indicating the points between which measurement is made and the operating mode (percent stretch or speed) of the apparatus.

It is another object of this invention to provide means for selecting different material lengths over which percent stretch and speed are measured in order to obtain average and instantaneous values.

It is an object of this invention to provide a digital computer having self-setting timing means for establishing a count accumulation period and a count display period.

It is another object of this invention to provide a digital computer having self-setting timing means which comprises a first scaler means and a second scaler means, said first scaler means receiving counting pulses supplied from a pulse generating means located at the input side of the processing machine as a function of the length of process material entering the machine, and supplying an output pulse for a predetermined number of input pulses received and resetting itself after receiving said predetermined number of pulses, said second scaler being connected to receive pulses from said first scaler and producing output pulses after a first number of pulses received from said first scaler, and again after a second number of pulses are received from said first scaler, and resetting itself after receiving said second number of pulses. The first output pulses from the second scaler being used to terminate the count accumulation period and initiate the count display period of the digital computer, and the second output pulse from the second scaler in conjunction with a simultaneous output pulse from said first scaler being used to terminate the count display period and reset the computer.

It is another object of the invention to provide a digital computer having a digital counter comprising multiple decade stages, each stage of which includes a visual display counting tube and counting scaler, and means controlled by self-setting timing means for blanking the digital counter during a count accumulation period, and for unblanking the digital counter during a count display period.

It is another object of this invention to provide a unique ring counter circuit particularly adapted for use in the digital computer described herein.

It is another object of this invention to provide indicator means for indicating which stage of a multiple stage ring counter is on at a particular instant.

These and other objects and advantages of the invention will be apparent from the specification, the appended claims and the drawings in which drawings:

FIG. 2 is an elevational view and circuit diagram of the transducer used in this invention.

FIG. 3 is a schematic diagram of a typical decade stage in the digital counter used in this invention.

Figure 1:
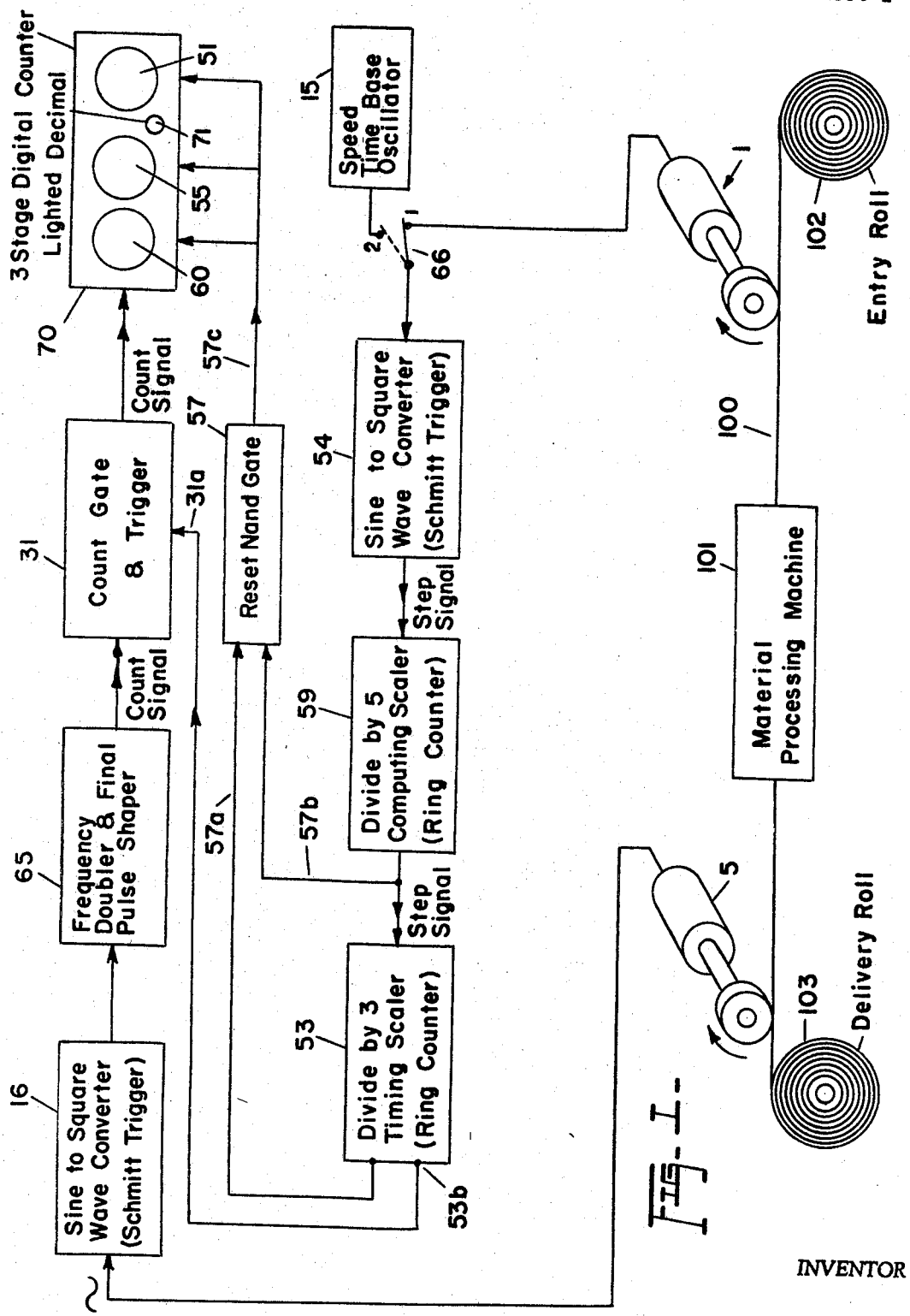
FIG. 1 is a block diagram illustrating a simplified form of the invention.
Figure 4A:
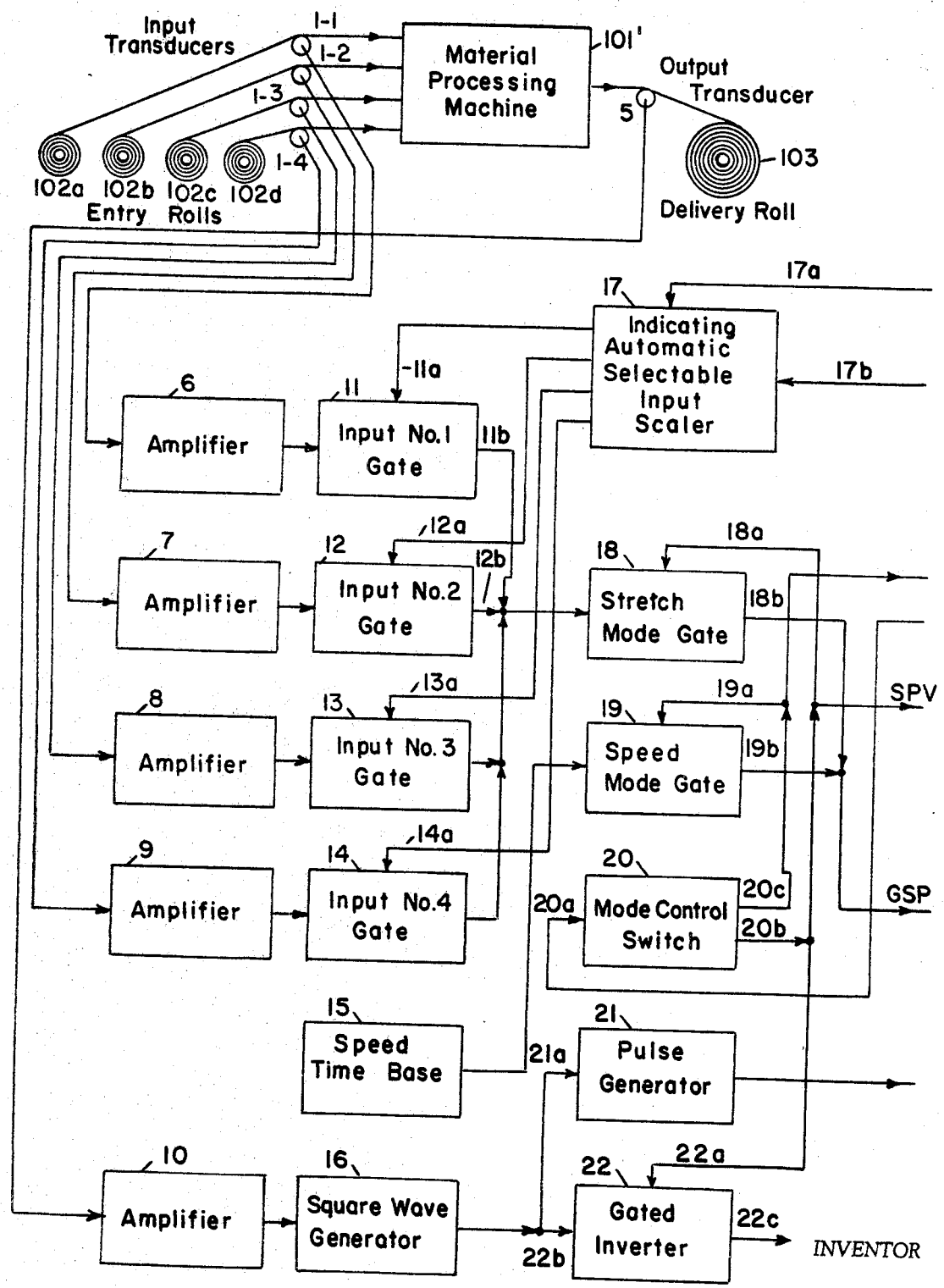
Figure 4B:
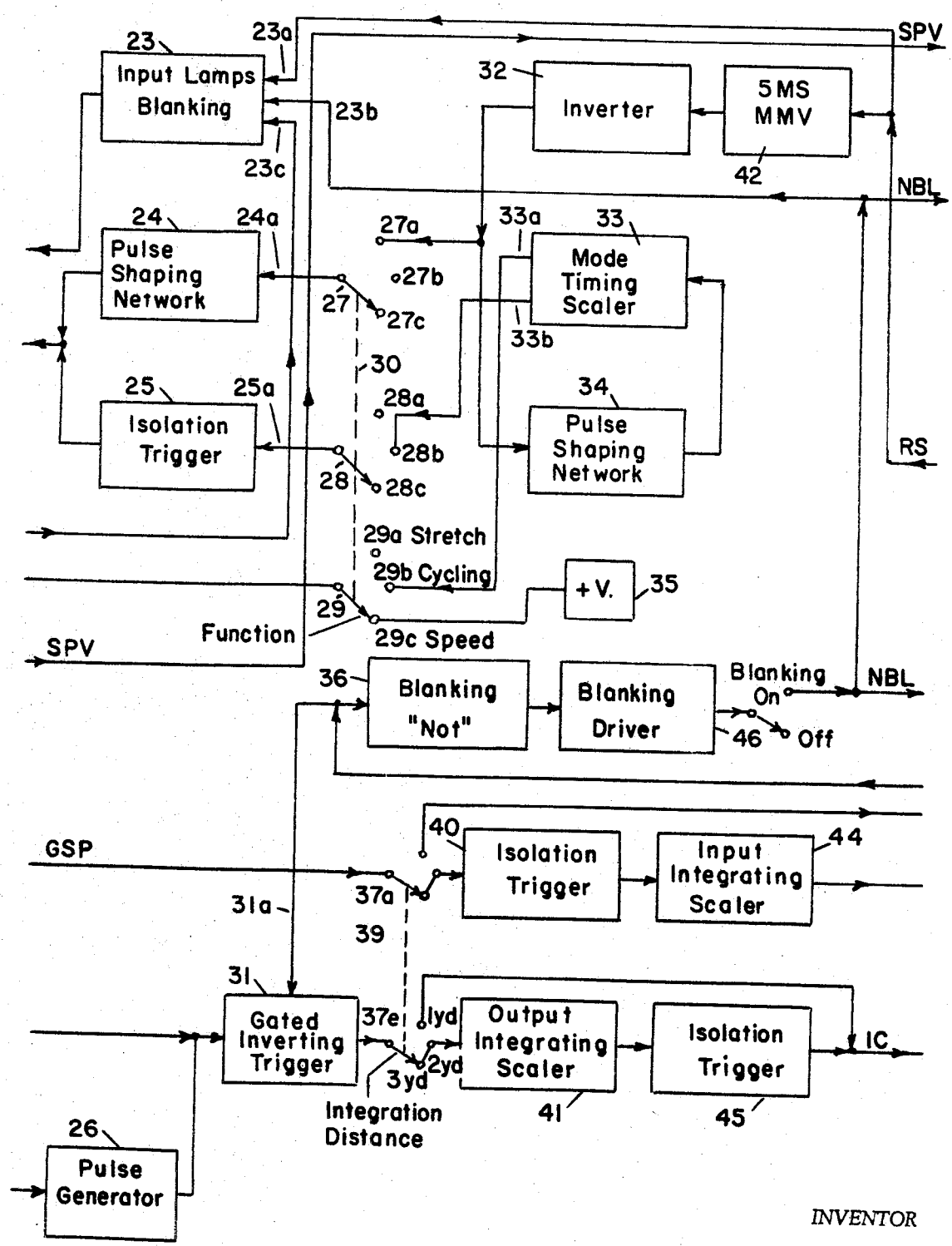
Figure 4C:
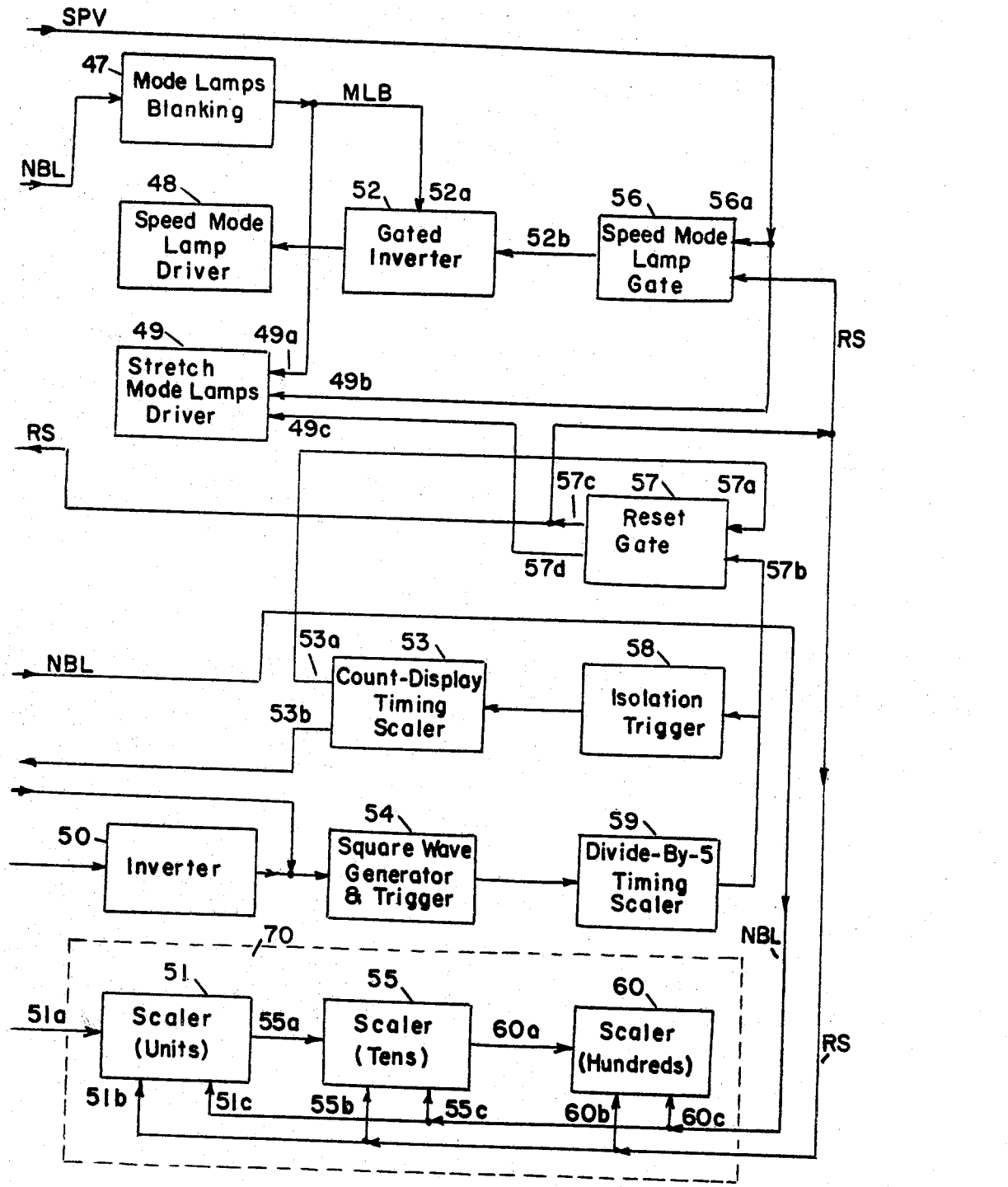

FIGS. 4A through 4C when arranged together are a block diagram of another form of the invention including auxiliary components not shown in FIG. 1.

Figure 5A:
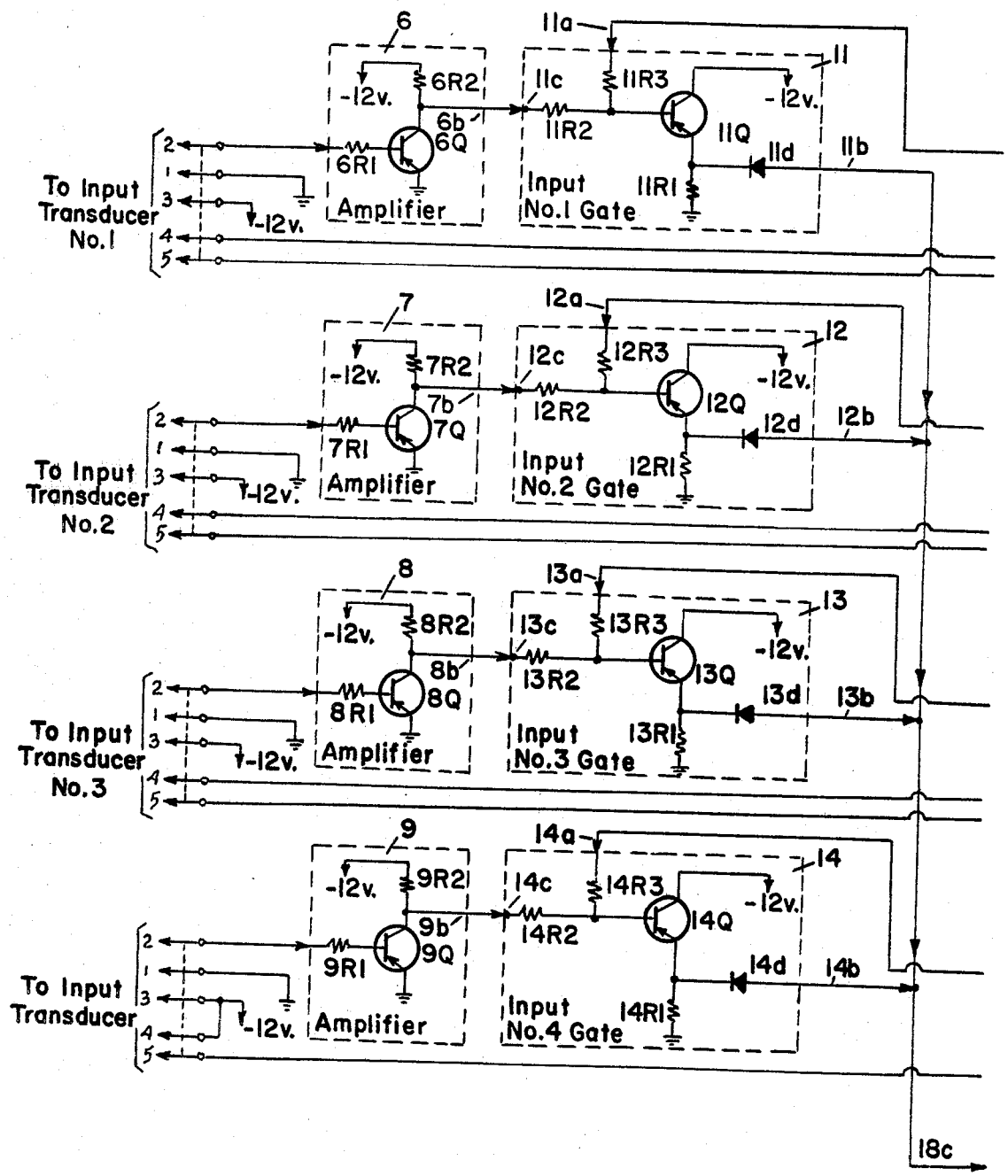

FIGS. 5A through 5I taken together are a schematic circuit diagram of the apparatus shown in FIGS. 4A–4C. The scalers shown in block in FIG. 5I are typified by the schematic diagram shown in FIG. 3.

Percent stretch measurement

The following describes the operating theory of a device to measure and display in digital form the elongation (percent stretch) of textile material due to processing.

The mathematical equation for percent stretch is as follows:

$$\text{Percent stretch} = \frac{S2 - S1}{S1} \times 100$$

where S1 is the length of material entering the process, and S2 is the length leaving the process. It can be seen that if percent stretch is measured exactly at the time that 1000 units (inches, feet, yards, etc.) of material have entered the process, then the result is exactly equal to the difference between S2 and S1 divided by 10. An example will better illustrate this point.

Assume $S1 = 1000$ yds.

and $S2 = 1003$ yds.

Therefore percent stretch $= \frac{1003-1000}{1000}(100) = \frac{3}{10} = .3\%$

Since stretch magnitudes never exceed 100% with most occurring under 20%, it can be further seen that the result of the previous example is equal to S2 alone if the numeral one in the thousands column is dropped and a decimal is placed between the units and tens columns.

Therefore, it becomes apparent that if a 3-stage digital counter, with a decimal located between the units and tens columns, is fed pulses from a transducer located at the delivery end of the processing machine at a rate of 1000 pulses per unit length of material flow, and whose count accumulation time is controlled by pulses from a transducer located at the input of the processing machine, such that the count time is exactly equal to the time required for one unit length of material to pass into the processing machine, as measured by the transducer located at the input of the processing machine, then the resultant display is percent stretch.

FIG. 1 illustrates in block diagram form the digital computing and indicating apparatus of the invention applied for measuring the percent elongation of material 100 being processed in a material processing machine 101 such as a textile slasher, or other machine in which the length of the material is subject to changes as a result of processing. The material is fed into the machine 101 from an entry roll 102 and is delivered from the machine to a delivery roll 103 which is driven to wind up the material after it has been processed. Tension on the material may be controlled by a variable speed drive (not shown) associated with the input roll 102 or other means so that the elongation of the material may be maintained within desired limits in accordance with the measurement indicated by this invention.

The invention utilizes an input transducer 1 for generating an alternating current signal having a period which is a function of the length of the material entering the processing machine, and an output transducer 5 for generating an alternating current signal having a period which is a function of the length of the material leaving the processing machine. The transducers 1 and 5 are similar in structure but may differ as to the selected ratio which the periods of the respective alternating current signals bear to the length of material being sampled. FIG. 2 shows the input and output transducers in detail. They comprise a surface contact wheel 104, mounted on a shaft 105 rotatably supported in bearings 106, 107, a light chopper disc 108 fixed on the shaft 105, an exciter lamp 109 positioned on one side of the chopper disc to direct a light beam through the chopper disc, and a photocell 110 positioned on the opposite side of the chopper disc to receive light intermittently through the rotating chopper disc. The surface contact wheels 104 preferably have a friction surface adapting the wheels to be driven by the material web without slippage. The wheel circumference is selected to have a predetermined length which bears a definite ratio with respect to the frequency of the alternating current signals from the transducers. The chopper discs 108 may be transparent plastic discs having evenly spaced black segments positioned thereon. In the illustrative example subsequently to be described the input transducer chopper discs are silk screened black on one half of the disc to produce one cycle per revolution. The output transducer chopper disc is silk screened black on 100 equally spaced segments to produce 100 cycles per revolution. The circumference of the contact wheels on all transducers is .2 yard. When the transducers are connected in circuit the exciter lamp 109 is supplied power through terminals 4 and 5. One side of the photocell 110 is connected to —12 volts D.C. through terminal 3, and the other side of the photocell 110 is connected to the base of a PNP transistor 111. Terminal 1 connects the emitter and the base of transistor 111 to ground through load resistor 112 and bias resistor 113 respectively. Terminal 2 connects the output signal from the emitter of the transistor to utilize circuits subsequently to be described. The collector of transistor 111 is connected to terminal 3 and thus to —12 volts D.C.

The invention further utilizes a multiple stage digital counter 70 which is provided with means to present a visual display of the accumulated count. A preferred digital counter is one having three stages 51, 55 and 60 with a lighted decimal lamp 71 between the stages 51 and 55. Each stage includes a "Nixie" numerical readout tube 72 and a scaler circuit 73 such as the one shown in FIG. 3. The "Nixie" tube is one manufactured under the trade name "Nixie" by Burroughs Corporation or its licensees. Other visual display digital counters which display an accumulated count can be used.

The digital counter 70 is controlled by cyclic timing means which is in turn under control of the input transducer 1 to have a count accumulation period, and a display period after which the digital counter 70 is automatically reset to zero for a new counting and display cycle. The digital counter 70 counts pulses derived from the alternating current signal from output transducer 5 during the count accumulation period. In the measurement of percent elongation the count accumulation period is the time required for a predetermined number of units of length of material to travel past the input transducer. Preferably the visual display of the digital counter 70 is blanked during the count accumulation period after which the counter is permitted to display the accumulated count for a period sufficiently long to enable an operator to interpret the display.

Tracing the alternating current signal from the output transducer 5 to the digital counter 70, it first passes into a Schmitt trigger 16 which converts the approximate sine wave output to a fast rise and fall square wave. The square wave signal then passes to a frequency doubler 65 which derives pulses from both rising and falling edges of the square wave. These pulses are finally shaped by RC networks to approximately 10 microsecond width and are passed on to a count gate 31. This consists of a transistor switching circuit driven by the pulses from the frequency doubler 65 with an over-riding turn-off signal entering on the count disable line 31a. With voltage present on the count disable line 31a, the count gate is biased off, and this prevents count pulses from entering the digital counter 70. With no voltage present on the count disable line, the count pulses are passed on to the counter 70 and the result is accumulated.

Tracing the signal from the input transducer 1, it first enters a Schmitt trigger 54 for the same reason as described above in respect to the output transducer 5. From there it passes in the form of step pulses to the divide-by-5 computing scaler 59, which consists of a silicon controlled switch ring-of-5 ring counter. One output pulse is delivered from this ring counter for each 5 pulses which enter, and this signal is fed into both the divide-by-3 timing scaler 53 and the reset gate 57. The divide-by-3 timing scaler 53 consists of a silicon controlled switch ring-of-3 ring counter with outputs from the first and third stages. The output signal from the first stage forms the count disable signal to control the count gate 31, previously described. The output signal from the third stage along with the output signal from the divide-by-5 computing scaler 59 forms the input signals to the reset gate 57. The reset gate 57 consists of transistorized circuitry to provide resetting of the digital counter stages when no input voltage is applied to both inputs.

Before entering into a detailed analysis of the circuit operation, some mention of starting conditions may be helpful. Unlike some computer circuits there is no need for special so-called "Set" circuits to program each stage to a given condition prior to operating. As the transducers 1 and 5 send pulses to the circuit, it will, after one (1) complete cycle, be ready for continuous operation. Absolutely no lockup can occur since all circuits are self-setting.

In order to avoid confusion in the analysis, it will be assumed that the circuit has been placed in operation and one (1) complete cycle has been made with the counter now in the reset position. Each reference to circuit conditions will assume that the transducers are, at that instant, stopped. Furthermore, it will be assumed that during the analysis of one (1) cycle, the process material 100 contains zero percent stretch.

In the reset position the following circuit condition exists:

(1) The divide-by-5 computing scaler 59 is in position 5 (last position) with no voltage output at position 5.

(2) The divide-by-3 timing scaler 53 is in position 3 (last position) with no voltage output at position 3.

(3) The reset gate 57 is open to reset the digital counter stages 51, 55 and 60 with no voltage present at both inputs.

(4) The count gate 31 is closed to prevent counts from entering the digital counter with no voltage present on count disable line 31a.

Therefore, if at this time the output transducer 5 is allowed to turn while the input transducer 1 is held stopped, no change in the above conditions will occur. This illustrates the input transducers control over the entire circuit.

Assume, however, that each transducer 1 and 5 advances exactly 1 revolution. A revolution starts at the instant the input transducer 1 delivers a change in output sufficient to cause its Schmitt trigger 54 to deliver a pulse to the divide-by-5 computing scaler 59, as described below. The input transducer delivers one cycle to the Schmitt trigger 54, and it in turn delivers one pulse to the divide-by-5 computing scaler 59 causing it to change from position 5 to position 1. As it changes from position 5 to position 1 it delivers a pulse to the divide-by-3 timing scaler 53 and simultaneously applies a voltage to the reset gate 57. The reset gate, requiring no voltage on both inputs to open, closes and removes reset voltage from the digital counter stages. The pulse delivered to the divide-by-3 timing scaler 53 causes it to change from position 3 to position 1. This action results in a voltage output appearing at position 3 and the removal of voltage output at position 1. The occurrence of voltage at position 3 coincides with the occurrence of voltage at position 5 on the divide-by-5 computing scaler 59. Both inputs to the reset gate 57 now have voltage applied and, as stated above, the reset gate closes. The simultaneous removal of voltage at position 1 of the divide-by-3 timing scaler causes the count gate 31 to open, thereby permitting count pulses to enter the digital counter 70.

The output transducer 5, having turned one revolution also, delivers 100 cycles to the other Schmitt trigger 16. It in turn delivers 100 cycles (square wave) to the frequency doubler and final pulse shaper 65. Here, sharp pulses are derived from both rising and falling edges of the square wave. These are in turn shaped by RC networks to approximately 10 microsecond width and are fed to the count gate 31. This gate 31, being opened simultaneously, passes the pulses directly to the digital counter 70 where they are accumulated. This accumulated total for one revolution equals 100×2 or 200.

During the next revolution of both transducers 1 and 5, each delivers the same number of cycles to their respective Schmitt triggers 54 and 16 as during the previous revolution. The divide-by-5 computing scaler 59 changes from position 1 to position 2 but no change occurs at its output terminal. Therefore, all circuits beyond this point remain as before. The 100 cycles (square wave) delivered to the frequency doubler and final pulse shaper 65 is again multiplied by 2, shaped and fed via the open count gate 31 to the digital counter 70, where the accumulated total now is 400.

The same action takes place during the next two revolutions of the transducers 1 and 5, and after exactly four revolutions the accumulated total in the digital counter is 800.

As both transducers 1 and 5 advance for the fifth revolution the digital counter 70 again receives 200 counts, bringing its total to exactly 1000 counts. The divide-by-5 computing scaler advances to position 5, but does not pulse the divide-by-3 timing scaler, so no further changes in the circuit occur.

At the instant that revolution number 6 begins, the divide-by-5 computing scaler advances from position 5 to position 1. This delivers a pulse to the divide-by-3 timing scaler 53 advancing it from position 1 to position 2. This causes an output voltage at position 1 which energizes the count disable line resulting in the count gate 31 closing and blocking any further count pulses. The computing time interval is now complete and the digital counter 70 now displays 00.0% stretch. The display time interval now starts and will continue for the next eight revolutions of the transducers 1 and 5. This can be understood since it requires five revolutions to advance the divide-by-5 computing scaler 59 through five steps with this in turn advancing the divide-by-3 timing scaler 53 once. From the start of the display time interval it is necessary to advance the divide-by-3 timing scaler 53 to position 3 and then have the divide-by-5 computing scaler 59 advance to position 5 to initiate the reset. This occurs during the tenth revolution after the start of the display time interval. The eleventh revolution starts the entire process again.

Speed of process material measurement

When it is desired to measure the speed of the process material as it leaves the processing machine, the same apparatus described above for measuring the percent elongation of the material can be used requiring merely the substitution of a speed time base oscillator 15 for the input transducer 1. This may be accomplished as shown in FIG. 1 by moving the two position switch 66 from position 1 to position 2, thus disconnecting the input transducer 1 from the Schmitt trigger 54 and connecting speed time base oscillator 15 to the Schmitt trigger in its stead. As will subsequently be described automatic means may be provided for periodically and alternately connecting the input transducer 1 and the speed time base oscillator 15 to the Schmitt trigger 54 in order to alternately measure and indicate percent elongation and speed.

Speed can be defined as distance travelled per unit of time. Therefore, if a digital counter is fed pulses from a transducer located at the delivery end of the processing machine at a rate of X pulses per unit length of material flow, and whose count accumulation time is controlled by pulses from a fixed frequency oscillator with an output frequency, $f$ cycles per second, then the resultant display will be proportional to the speed of the material at the delivery end of the processing machine. The resultant display can be made exactly equal to the actual speed by proper choice of the gating frequency.

The output transducer 5 delivers 500 pulses per yard. With the contact wheel circumference equal to 0.2 yard, then, Pulses per revolution=500×0.2=100

Assume the transducer 5 is turning at 100 surface yards per minute. Therefore, the resultant display must be 100. At 100 y.p.m. with the transducer delivering 100 pulses per revolution, it is obvious that the counter 70 must be allowed to count for the time required for the transducer 5 to make one revolution, thereby delivering exactly 100 counts. Since the circumference of the contact wheel 104 is 0.2 yard, 100 y.p.m. equals 500 r.p.m. The time for one revolution then is equal to 60 seconds/ 500=0.125 seconds. This, then is the time that the counter 70 must be allowed to count. As has been explained, five pulses delivered to the divide-by-5 timing scaler 59 are required to step the circuit through the computing time interval, during which time pulse accumulation occurs in the counter 70. Therefore, five cycles of the oscillator output signal must yield a time period of 0.125 second. It then follows that the oscillator frequency must be exactly 40 cycles per second.

The block diagram in FIGS. 4A, 4B and 4C taken together show the digital computer and indicator described with reference to FIGS. 1 and 2 connected in a more elaborate system and including the following means:

(1) Means for measuring and displaying in digital form the elongation (percent stretch) in material due to processing.

(2) Means for manual or automatic selection of measuring points to facilitate use on multiple input or output machines.

(3) Means for measuring and displaying in digital form the speed of the material through the processing machine.

(4) Means for manual selection of percent stretch and speed, means for automatically cycling between percent stretch and speed, and means for automatically cycling from one measuring point to the next while alternately indicating speed.

(5) Means for indicating visually the points between which measurement is made and the operating mode (percent stretch or speed) of the device.

(6) Means for varying the material length over which percent stretch and speed are measured in order to obtain average and instantaneous values.

Schematic circuit diagrams for the apparatus shown in block form in FIGS. 4A, 4B and 4C taken together are shown in FIGS. 5A–5I taken together. The dotted line blocks in the schematic circuit diagrams correspond with similarly numbered blocks in the block diagram of FIGS. 4A and 4B. The circuit components within the blocks as shown in the schematic circuit diagrams are preferred circuit components. However, circuit components of similar function can be substituted for those shown within the scope of the invention as claimed.

The apparatus shown in FIGS. 4A–4C includes a material processing machine 101', plural material input rolls 102 (a, b, c and d), plural input transducers 1–1, 1–2, 1–3, 1–4, a delivery roll 103 and an output transducer 5. The input transducers 1–1 through 1–4 and the output transducer 5 are similar to corresponding transducers 1 and 5 described with reference to FIGS. 1 and 2. However, since in some processing machines plural material input rolls are provided to feed material into the machine, the apparatus shown in FIG. 4A includes multiple input transducers, one for each input roll. Although not shown, multiple output transducers 5 could also be provided for processing machines having multiple outputs.

The apparatus shown in FIGS. 4A–4C taken together is adapted to operate under one of three primary modes of operation, one, where the percent stretch alone is being measured and indicated, two, where speed alone is being measured and indicated, and three, where percent stretch and speed are alternately and cyclically being measured and indicated. The mode of operation is selected by the operator of the machine and manually controlled by means of a function switch 30 including three mechanically linked but electrically isolated pivoted contacts 27, 28 and 29, and three sets of three fixed contacts 27a, 27b, 27c, 28a, 28b, 28c and 29a, 29b, 29c respectively associated with the pivoted contacts. The pivoted contact 27 is connected to terminal 24a of a pulse shaping network 24, the pivoted contact 28 is connected to the input terminal 25a of an isolation trigger 25, and the pivoted contact 29 is connected to the input terminal 20a of a mode control switch 20.

Each of the primary modes of operation may be varied by selective manual control of a blanking switch 46 to either an ON or an OFF position.

During the time the counter is accumulating the resultant stretch or speed, the figures are changing at a very high rate of speed on the order of several thousand per second. When the blanking switch is in the OFF position, this fast counting action can be observed. When the blanking switch is in the ON position, the display is de-energized and cannot be seen.

Figure 5B:
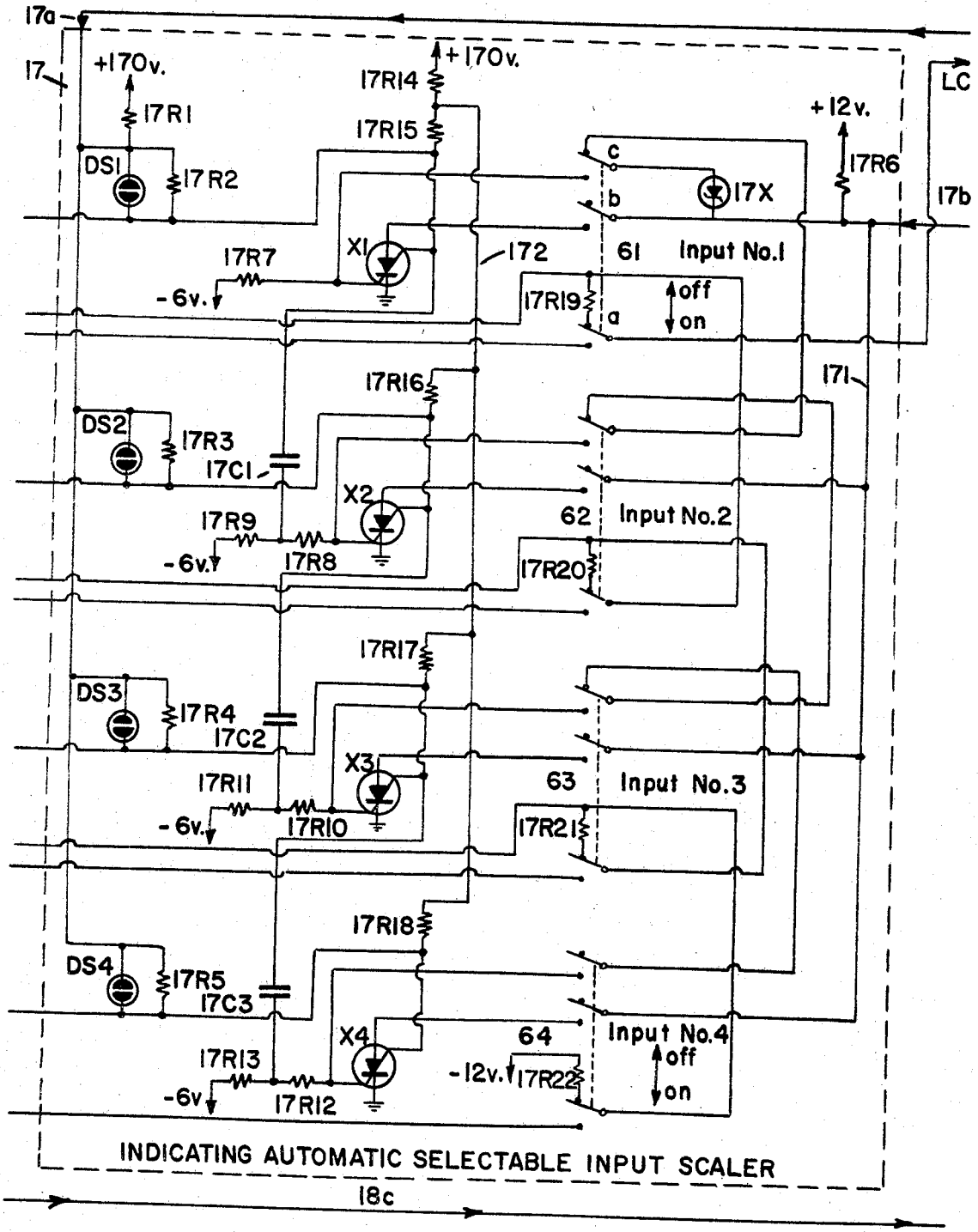
Figure 5C:
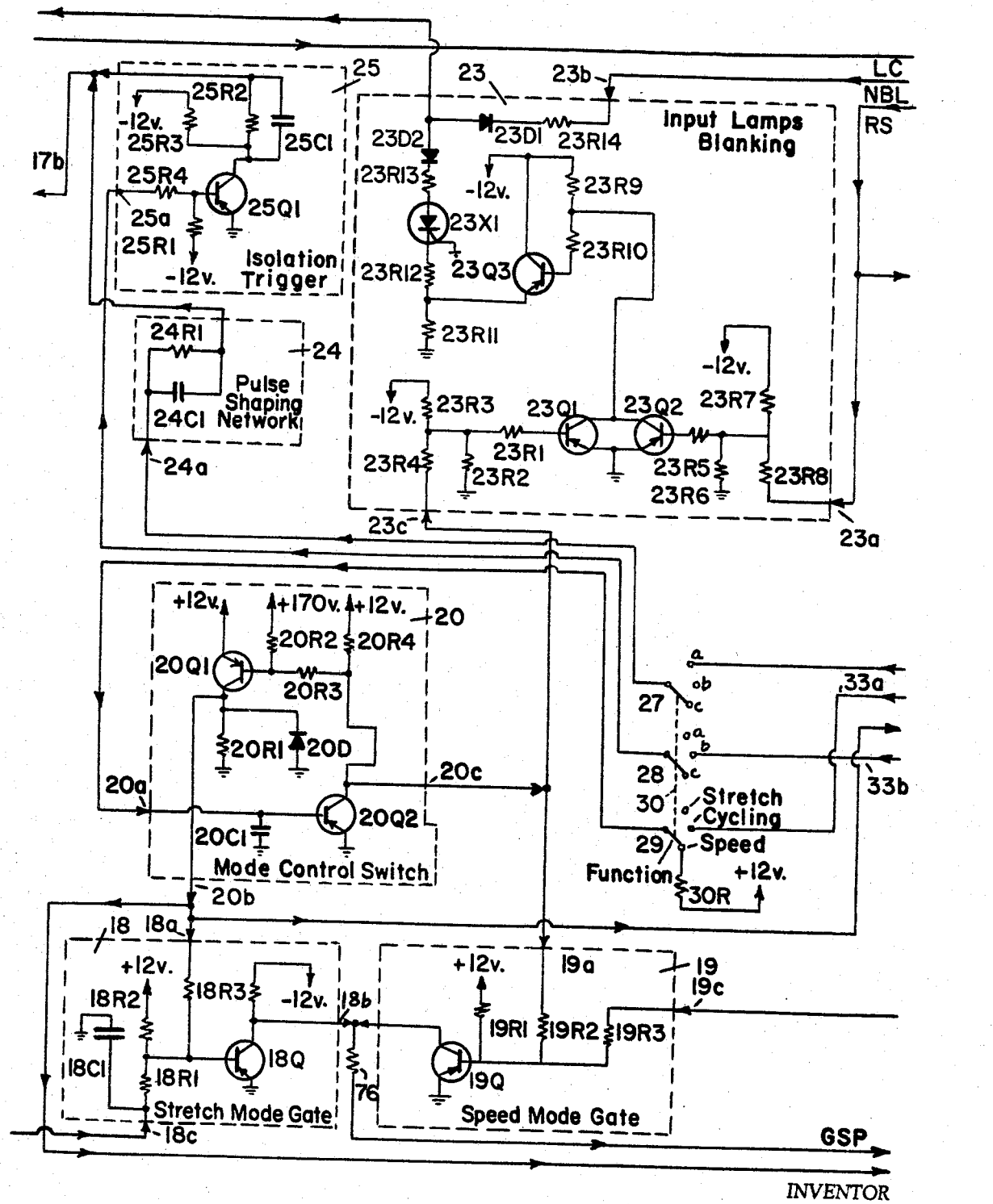
Figure 5D:
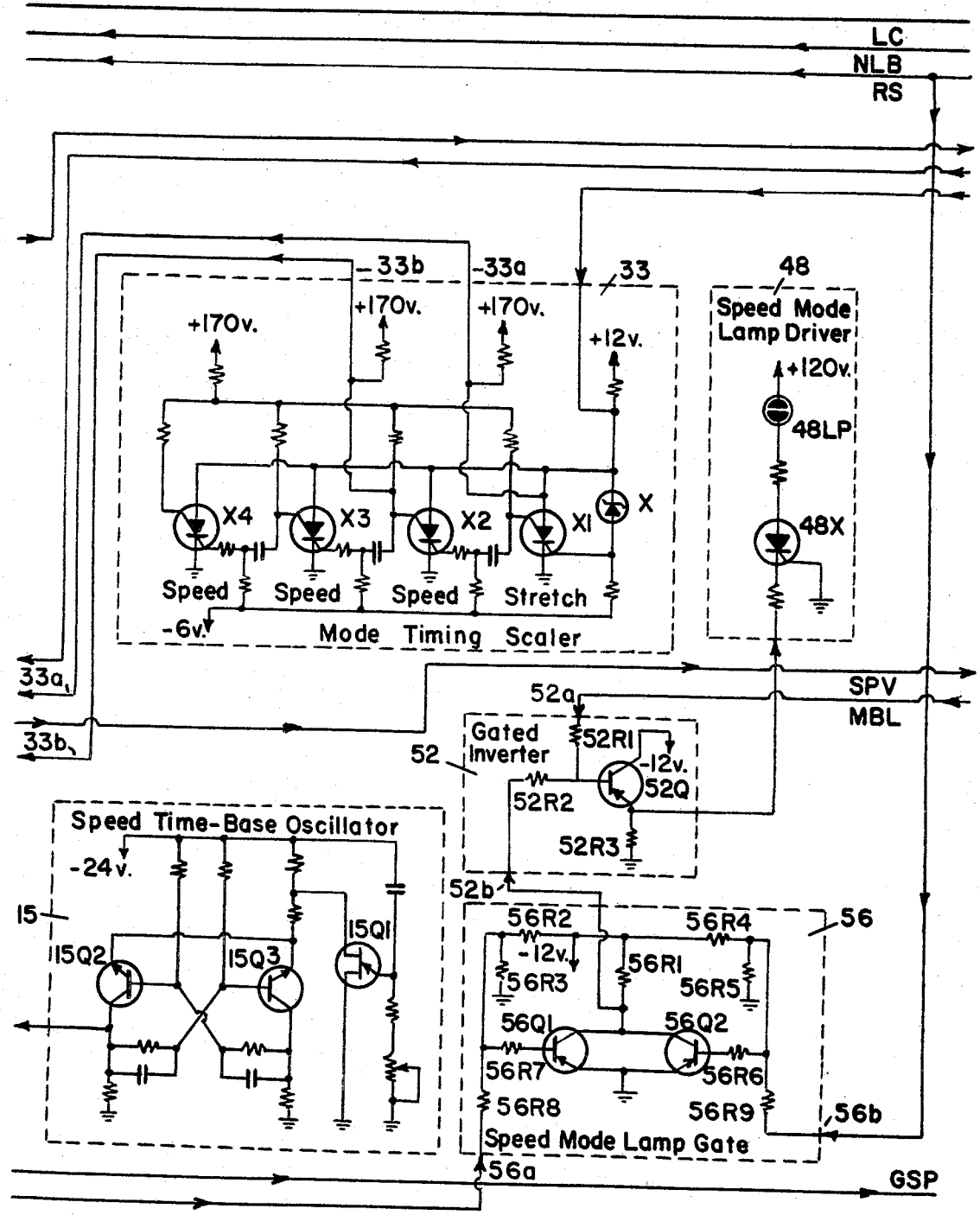

The stretch indicating and cyling modes may be varied by means of an indicating automatic selectable input scaler 17 having manually actuated input selector switches 61, 62, 63 and 64 (see FIG. 5B). There is one input selector switch for each input transducer. Each switch is a triple pole, two position switch, the positions being marked OFF and ON. With any one switch positioned ON, measurement is made from that input. With any two or more switches positioned ON, measurement is automatically cycled between the selected inputs. Visual indicator lamps DS1, DS2, DS3 and DS4 are provided to indicate which input transducer is connected.

The individual block components will now be described in detail beginning with the digital counter 70, and considering in turn the count accumulation and count display timing circuits, the count pulse circuit to the digital counter, and various auxiliary circuits.

Digital counter (Refer to FIGS. 1, 3, 4C and 5I)

As previously stated the digital counter 70 displays a visual numerical representation of the value computed by the invention. The digital counter 70 includes three decade stages 51, 55, 60. Each stage includes a visual indicating counting tube 72, and a scaler circuit 73 for advancing the count as each new count pulse is received. The stages are connected so that for each ten pulses received by the first stage, an output pulse will be delivered to the second stage and for each ten pulses received by the second stage an output pulse will be delivered to the third stage. Each tube 72 includes means for displaying the count accumulated by the counting tube at any given instant. A preferred counting indicator tube as previously mentioned is one manufactured by Burroughs Corporation under the trade name "Nixie." Such tubes include a gas filled transparent envelope, as anode, and ten cathode indicator elements, 0–9, each configured in the shape of a numeral. The digital counter 70 also includes a lighted decimal 71 between the first and second stage.

The anode of each counter tube 72 is connected through an anode load resistor 72R1 to a positive 170 volt DC source. Each anode is further connected through a diode 74 to a blanking circuit NBL which delivers blanking pulses to the counter. The cathodes of each tube are connected to succeeding stages of the scaler, and are caused to fire in succession as the respective stages of the scaler to which the cathodes are connected are turned on.

The scaler circuit 73 is essentially similar to all the other scale circuits used in this invention. All of the scaler circuits include a plurality of connected stages, each stage including a silicon controlled switch, hereafter referred to by the letter SCS. The scaler circuits associated with the counting tubes include ten stages designated X1–X10 and a Zener diode X for turning on the first stage X1. The cathodes of each stage are connected to ground. The anodes a of each stage are commonly connected. A resistor 73R1 connects the common anode lead to a reset voltage feed line RS. The Zener diode X connects the cathode gate GC to the anode a of the first SCS stage X1, the cathode of the Zener diode X1 being connected to the SCS anode and the anode of the Zener diode being connected to the SCS cathode gate. The cathode of the first SCS stage X1 is also connected through a resistor RGC1 to a negative 6 volt source. The anode gates of each SCS stage are connected by load resistor RL1 through RL10 respectively to a positive 170 volt source through common resistor 73R2. The anode gates of SCS stages X1 through X9 are capacitively coupled to the cathode gate of the next succeeding stage by means of capacitors C1 through C9 in series with cathode gate current limiting resistors RG1 through RG9 respectively. Cathode gate resistors RGC2 through RGC10 connect respectively the junction between the coupling capacitor and cathode gate current limiting resistor for succeeding SCS stages to the negative 6 volt source.

The count pulse for each scaler is fed to the common anode lead. Count pulses to the first stage of the counting tube scaler 51 are fed via the line designated IC. Voltage is normally connected to the SCS anodes through 73R1 to latch the SCS's on in the absence of any positive cathode gate signal. Once turned on by a positive signal at the cathode gate, it is necessary to momentarily break the anode connection to turn off the SCS even if the cathode gate signal has been removed.

When the scaler 51 is first connected to power, assuming that there is no input on IC and there is a positive 12 volts present on RS, it is necessary to have the first stage turn on. This is accomplished by means of the low voltage Zener diode X connected from the anode to the cathode gate of the SCS X1. If the Zener diode X were not in circuit, the voltage from anode to ground would be approximately equal to the positive voltage supplied by the line RS since all SCS's would be off and would be held off by the resistors RGC1 through RGC10 respectively connected to the −6 bolt. By connecting the Zener diode X as shown, the cathode gate of the first SCS stage X1 is effectively placed at a positive potential equal, approximately to +12 v. −VZ, where VZ is the voltage drop across the Zener diode X. This insures that the first stage X1 turns on. Once on, the voltage from anode to ground drops to nearly zero, thereby removing the turn-on signal from the cathode gate of X1. Now with the first stage on, the scaler 51 is ready to receive input pulses. Each input pulse voltage should be greater than the forward drop of the SCS when on, and must have a pulse width less than the cross coupling time constant of C1 and RG1.

In practice, this is about −5 volts with a width of 20 microseconds. When an input pulse is applied, it causes the locking voltage from RS to be momentarily interrupted, thereby turning off X1. During the time that X1 was on, the capacitor C1 connected to its anode gate was charged from −6 volts through RGC2, since the anode gate was essentially at ground potential. When X1 turns off, the rising voltage at the anode gate of X1 triggers the next stage X2 into conduction via C1 and RG1. The next input pulse causes the same thing to happen, turning X2 off and triggering X3 on, and so on for the remaining stages as input pulses are received.

Each SCS is turned on and off in succession with one stage being turned on as the prior stage is turned off until the final stage is turned on. The next pulse received after the final stage is turned on, turns the final stage off. The voltage from anodes to ground then rises resulting in the Zener diode X turning the first stage on. From there the process is repeated over and over.

The count output pulse from the first counting stage 51 is transferred to the next counting stage through an isolating trigger comprising a PNP transistor 75Q1 having its emitter connected to ground, its base connected to the anode gate of the last SCS stage X10 through resistor 75R3 and to a negative 12 volt source through resistor 75R2, and its collector connected to the negative 12 volt source through resistor 75R1. The output from the transistor 75Q1 is fed from the collector through a parallel RC network comprising resistor 75R4 and capacitor 75C1 to the IC terminal of the next stage. The anode gate of the final stage X10 is connected to a positive 170 volt source through resistor 73R4.

The output from each SCS stage taken from the anode gate is applied to a corresponding cathode of the counting tube 72. As pulses are applied to successive cathodes 0 through 9 of the counting tube, configured indicator element light up and visually indicate the count received.

In order to prevent the indicator elements from flickering rapidly as the count accumulates, the counting tube may be blanked by pulses received over the NBL line.

Reset of the counting tubes is controlled by pulses transmitted over the RS line. The blanking and reset functions will subsequently be described.

Count accumulation and count display timing circuits

As described with reference to FIG. 1, the digital counter 70 is controlled so that it has a predetermined count accumulation period followed by a predetermined count display period. Different time bases may be selected depending on what function is to be measured. To supply the different time bases for selectively measuring percent stretch or speed several timing circuits have been provided in the circuit diagram shown in FIGS. 5A through 5I.

(1) Timing circuit for measuring percent stretch

When measuring percent stretch the count timing circuit is controlled by pulses received from one of the input transducers 1–1, 1–2, 1–3, or 1–4. Each of the input transducers is respectively connected to one of the amplifiers 6, 7, 8 and 9 which amplify the input signal.

The input amplifiers 6, 7, 8 and 9 each comprise a PNP transistor having the emitter connected to ground, the base connected in series with a current limiting resistor to the amplifier input terminal, and the collector connected through a load resistor to a negative 12 volt source. The output from the amplifiers 6, 7, 8 and 9 are taken from the junction of the emitter terminal and load resistor and are fed to the input terminals 11c, 12c, 13c and 14c respectively of the input gates 11, 12, 13 and 14.

The input gates 11, 12, 13 and 14 are identical and comprise emitter follower connected PNP transistors 11Q, 12Q, 13Q and 14Q respectively, each having the emitter connected through respective load resistors 11R1, 12R1, 13R1 and 14R1 to ground, the base connected through respective resistors 11R2, 12R2, 13R2 and 14R2 to the gate input C terminal and through respective resistors 11R3, 12R3, 13R3 and 14R3 to the gate bias $a$ conductor, and the collector connected to a negative 12 volt source. The gate output signal is fed from the emitter terminal through a diode to the gate output $b$ conductor. The diodes 11D, 12D, 13D and 14D may be silicon rectifiers or other one way devices which prevent the output signal from one input gate from being fed into another input gate. The output conductors of each input gate are connected to a common lead 18C which feeds the output signals from the successively opened and closed gates to the input terminal of the stretch anode gate 18. The input gates are normally biased closed by a gate bias voltage applied to respective input gate conductors 11a, 12a, 13a and 14a from corresponding stages of the indicating automatic selectable input scaler 17. When the bias voltage at the $a$ conductors is reduced to zero, the gates are opened to permit the input signal appearing at the $c$ terminals to pass.

The stretch mode gate 18 is a PNP transistor 18Q having its emitter connected to ground. Its base is connected through resistor 18R1 to the input signal conductor 18c, through resistor 18R2 to a positive 12 volt source and through resistor 18R3 to the stretch gate control bias terminal 18a. The transistor collector is connected through a load resistor 18R4 to a negative 12 volt source. The output signal from the stretch mode gate is taken from the emitter terminal and is fed to the pole 37a of an integration distance switch 37 over line GSP.

The integration distance switch 37 is a six pole three position switch which will be subsequently described in more detail. In the one yard position of the switch 37 pulses from the stretch mode gate 18 are fed directly to input conductor 54a of the square wave generator and trigger 54.

The square wave generator and trigger comprises a pair of NPN transistors 54Q1 and 54Q2. The collector of 54Q1 is connected to ground through resistor 54Q2; its base is connected to input conductor 54a through resistor 54R1; and its emitter is connected to a negative 12 volt source through resistor 54R4. Capacitor 54C1 connects the input conductor 54a to the negative 12 volt source. The collector of 54Q1 is connected to the base of 54Q2 by means of resistor 54R3 and capacitor 54C2 connected in parallel. The base of 54Q2 is connected to the negative 12 volt source through resistor 54R5. The emitter of 54Q2 is connected to the emitter of 54Q1. The collector of 54Q2 is connected to ground through resistor 54R6 and to the input terminal of the divide-by-5 timing scaler 59 through resistor 54R7 and capacitor 54C3 connected in parallel.

The square wave generator and trigger transmits triggering pulses in the form of step pulses to the divide-by-5 timing scaler 59.

The divide-by-5 timing scaler 59 is a five stage ring counter and is essentially similar to the scaler 73 described with reference to the digital counter 70. Other than having fewer stages than the scaler 73, the scaler 59 differs from the scaler 73 by having a positive 12 volt latching voltage applied through resistor 59R1 at all times whereas in the scaler 73 the application of the latching voltage is controlled by the reset gate 57. The scaler 59 has its first stage X1 initially turned on by the Zener diode X. Five pulses received by the scaler 59 steps successive stages and produces an output pulse after the fifth pulse is received. Further description of the scaler 59 is not believed to be necessary in view of the detailed description of scaler 73.

The output pulse from scaler 59 is applied through an isolation trigger 58 to the count display timer 53 and is also applied directly to the input terminal 57b of the reset gate 57.

The isolation trigger includes a PNP transistor 58Q1 having its emitter connected to ground, its base connected to the input terminal 58a through resistor 58R1 and to a −12 DC volt source through resistor 58R2, and its collector connected through load resistor 58R3 to the −12 DC volt source. The output from the isolation trigger is fed from the collector through a resistor 58R4 and parallel capacitor 58C1 to the common anode lead of the count display scaler 53.

The count display scaler 53 includes three SCS stages X1, X2 and X3. It is similar to the divide-by-5 timing scaler except for having fewer stages, and having an output 53b taken from the anode gate of the first SCS stage as well as an output 53a from the anode gate of the last SCS stage. The output line 53b taken from the anode gate of the first SCS stage is connected to the gated inverting trigger input gate terminal 31a. When the SCS stage X1 is on, no turn off voltage is applied over the count disable line 53b. When X1 turns off after one pulse is applied to the scaler 53, turn off voltage is applied to the gated inverting trigger over the count disable line. The output line 53a from the third SCS stage X3 is applied to the input terminal 57a of the reset gate 57.

The reset gate 57 includes a first stage NPN transistor 57Q1 and a second stage PNP transistor 57Q2. The emitter of transistor 57Q1 is connected to ground; its base is connected through series resistors 57R4 and 57R3 to ground. Control signals for the reset gate are applied from terminals 57a and 57b through resistors 57R2 and 57R1 respectively to the common junction of resistors 57R4 and 57R3. The collector of transistor 57Q1 is connected to a positive 170 volt source through resistor 57R5 and to a positive 12 volt source through resistor 57R6. The collector of transistor 57Q2 is connected to ground through resistor 57R8; its base is connected to the collector of 57Q1 through resistor 57R7, and its emitter is connected to the +12 volt source. A reset signal is taken from the collector terminal of 57Q2 over output line 57c and is applied to the reset line RS. A second output signal is taken from the collector terminal of 57Q1 over output line 57d and is applied to the input terminal 49c of the stretch mode lamps' driver 49.

In the absence of positive voltage at input terminals 57a and 57b of the reset gate both transistors 57Q1 and 57Q2 are off. A positive voltage is present on output line 57d but no voltage is present on output line 57c. When positive voltage is applied to terminals 57a and 57b simultaneously both transistors 57Q1 and 57Q2 conduct. The voltage on the output line 57d is then removed and an output signal now appears on output line 57c.

(2) Timing circuit for measuring speed

When measuring speed, the same count timing circuit used for measuring percent stretch is used except that a speed time base oscillator 15 is connected through speed mode gate 19 to the square wave generator and trigger 54 instead of one of the input transducers 1-1 through 1-4. The stretch mode gate 18 is turned off by the mode control switch 20 and the speed mode gate 19 is turned on.

The speed time base oscillator 15 may be any stable oscillator capable of generating an output signal of predetermined frequency. Its output signal is applied to the input terminal 19c of the speed mode gate 19.

The speed mode gate 19 is similar to the stretch mode gate previously described. It includes a grounded emitter PNP transistor 19Q. The base of the transistor is connected to a +12 DC volt source through resistor 19R1. Control bias for the speed mode gate is applied to the collector of 19Q through resistor 19R2 from the mode control switch 20. The input signal from the speed time-base oscillator 15 is applied to the base of transistor 19Q through resistor 19R3. In the absence of control bias voltage at the input bias terminal 19a, the speed mode gate is open and input signals from the speed time base oscillator 15 are permitted to pass through. The output from the speed mode gate is taken from the collector terminal of the transistor 19Q and is applied through resistor 76 to the line designated GSP. The collectors of the speed mode gate transistor 19Q and the stretch mode gate transistor 18Q are connected at a common junction with one end of the resistor 76. Both collectors are also commonly connected through load resistor 18R4 to a −12 volt DC source.

The path of the speed time base signals from the speed mode gate is identical with the path of the signal pulse from the stretch mode gate previously described.

Count pulse circuit to digital counter

Referring to the block diagrams in FIGS. 4A through 4C, the count pulse circuit to the digital counter 70 may be traced from the output transducer 5, amplifier 10 and square wave generator 16 in series. The signal from the square wave generator 16 is divided and one part is fed to pulse generator 21 and the other part is fed to gated inverter 22.

The gated inverter 22 is controlled by bias voltage received from the mode control switch 20 over the line 22a. Whenever the mode control switch 20 is conditioned to permit the stretch mode gate to open, the gated inverter 22 is also permitted to open. The part of the square wave generator signal which passes through the gated inverter 22 when it is open is inverted and applied to the pulse generator 26. The signal applied to pulse generator 26 is, therefore, 180 degrees out of phase with the signal applied to pulse generator 21. The output signals from pulse generators 21 and 26, being effectively 180 degrees out of phase, are superimposed and applied to the count input terminal of the gated inverter trigger 31. The count input signal applied to the gated inverter trigger is double the frequency of the signal generated by the output transducer 5. When no bias voltage is applied over the count disable line 31a, the count pulse passes through the gated inverting trigger 31 and is applied through pole 37e of the integration distance switch (in the one yard position) to the input line 51a of the first decade counter stage 51 in digital counter 70. The counts are accumulated in digital counter 70 in a manner previously described under the heading Digital Counter.

Referring now to the schematic drawings in FIGS. 5A through 5I, a brief description will be given of the block components incorporated in the count pulse circuit to digital counter 70.

Figure 5E:
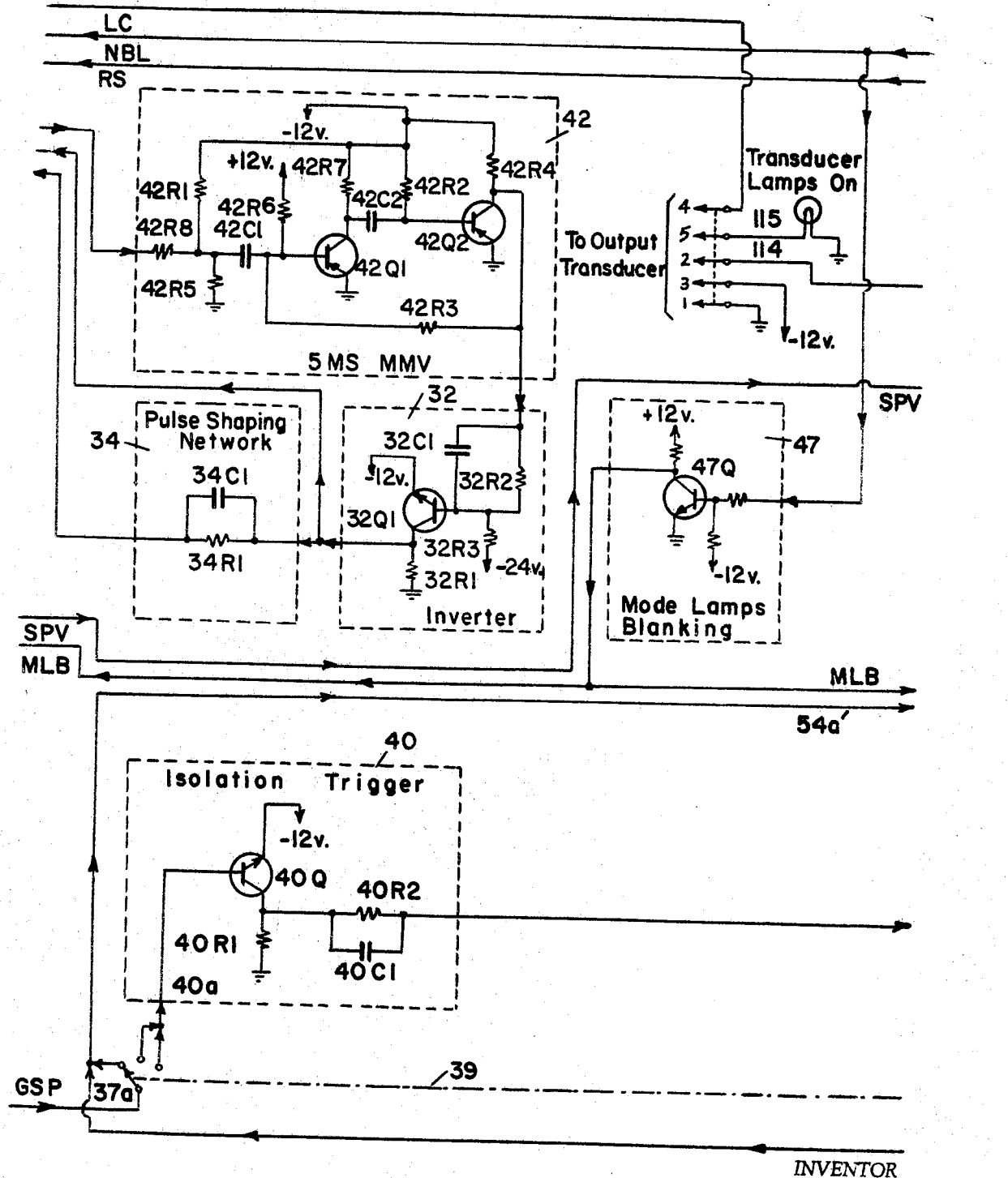

The output transducer 5, similar to the transducer shown in FIG. 2, is connected to terminals 1, 2, 3, 4 and 5 shown in the upper right-hand corner of FIG. 5E of a five pole single throw manual on-off switch 114. The terminals of the output transducer 5 are connected through the switch 114 as follows: terminal 1 to ground, terminal 2 to the input terminal of amplifier 10, terminal 3 to a −12 DC volt source, terminal 4 to the LC line, and terminal 5 through an indicator lamp 115 to ground. The LC line is connected through the indicating automatic selectable input scaler 17 to a −12 DC volts. The circuit for supplying DC voltage to the exciter lamp 109 of the transducer 5 may be traced from ground, through indicator lamp 115, switch 114, terminal 5, the filament of the indicator lamp 109, terminal 4, switch 114, the LC line to the movable contact 61a of the manual on-off switch 61 in the indicating automatic selectable input scaler 17. When all of the input manual on-off switches 61, 62, 63 and 64 are in the off position, the energizing circuit for the output transducer exciter lamp is completed through the resistors 17R1, 17R2, 17R3 and 17R4 in series with the −12 DC volt source and back to ground. When one or more of the input manual on-off switches are in the on position, the output transducer exciter lamp circuit is completed through the exciter lamp filaments of the input transducers which are on and any of the resistors 17R1, 17R2, 17R3 and 17R4 which are connected in circuit by reason of their associated input manual on-off switches being in the off position.

The amplifier 10 (see FIG. 5F) is a conventional PNP transistor amplifier 10Q having its emitter connected to ground, its collector connected to −12 volts DC through resistor 10R2, and its base connected to −12 volts DC through resistor 10R1. The input signal from the output transducer is fed to the base of the transistor 10Q through capacitor 10C and resistor 10R3 in series.

The square wave generator 16 is a basic Schmitt trigger the operation of which will be understood by those familiar with the art. It includes NPN transistors 16Q1 and 16Q2 having their emitters connected to a −12 volt DC bus through resistor 16R8, and their collectors connected to ground through resistors 16R4 and 16R9 respectively. The base of 16Q1 is connected to the −12 volt DC bus through resistors 16R3 and 16R1 in series. The collector of 16Q1 is connected to the base of 16Q2 through capacitor 16C1 and parallel resistor 16R5. The base of 16Q2 is also connected to the −12 volt DC bus through bias resistor 16R7. The input signal from amplifier 10 is fed to the base of 16Q1 through resistor 16R2 which is connected to the common junction of resistors 16R1 and 16R3. The output from the square wave generator 16 is taken from the collector of 16Q2 and is fed to the gated inverter 22 and to the pulse generator 21 (see FIG. 5G).

The gated inverter 22 comprises a NPN transistor 22Q having its emitter connected to a −12 volt DC bus through resistor 22Q4, and its collector connected to ground through load resistor 22R5. The base of 22Q is connected to a −24 volt DC bus through bias resistor 22R2 and to the mode control switch terminal 20b via resistor 22R3 and line SPV. The input signal from the square wave generator is fed to the base of 22Q through resistor 22R1. The output signal is taken from the collector of 22Q and is fed to pulse generator 26.

Pulse generators 26 and 21 are similar, the former being fed from gated inverter 22 while the latter is fed directly from the square wave generator 16. They comprise PNP transistors 26Q and 21Q1 respectively, having their emitters connected to ground and their collectors connected to a −12 volt DC bus through resistors 26R2 and 21R2 respectively. The base of 26Q and the base of 21Q are connected to the −12 volt DC bus through bias resistors 26R1 and 21R1 respectively. The input signal to the base of 26Q is fed from the gated inverter through capacitor 26C1, and the input signal to the base of 21Q1 is fed from the square wave generator through capacitor 21C1. The output signals from 26Q and 21Q1 are taken from their collector terminals and passed through diodes 26D and 21D respectively to a common input terminal 31C in the gated inverting trigger 31.

The gated inverting trigger 31 comprises a PNP transistor 31Q1 and NPN transistor 31Q2. The collector of 31Q1 is connected to the base of 31Q2 through resistor 31R5 and to a −12 volt DC bus through load resistor 31R6. The emitter of 31Q1 is connected directly to ground and the emitter of 31Q2 is connected directly to the −12 volt DC bus. The base of 31Q1 is connected through resistors 31R3 and 31R2 in series to ground. The input signals from the pulse generators 21 and 26 are fed through resistor 31R1 to the common junction of resistors 31R3 and 31R2. The bias voltage from the count disable line 31a is fed to the base of 31Q1 through resistor 31R4.

The collector of 31Q2 is connected to ground through load resistor 31R7. The capacitor 31C1 and parallel resistor 31R8 connected in series with capacitor 31C2 between the collector of 31Q2 and ground shape the signal developed across load resistor 31R7. The output signal from the gated inverting trigger is taken from the common junction of 31R8, 31C1 and 31C2 and is fed through the pole 37e of the integration distance switch in the one yard position to the digital counter 70 over the count pulse line 1C.

Distance integration switch

The distance integration switch 37 (shown at the bottom of FIGS. 5E through 5G) is a six pole three position switch wherein the different positions represent 1 yard, 2 yards and 3 yards respectively. The purpose of the distance integration switch 37 is to vary the internal circuits of the digital counter so that percent elongation can be measured over selected base distances of 1 yard, 2 yards and 3 yards respectively.

When the selected base distance is one yard, the circuit is the same as that described with reference to FIG. 1. The timing circuit controlled by the pulse from the input transducer functions to permit the digital counter 70 to accumulate counts from the output transducer 5 during the time required for five pulses to be transmitted by the input transducer 1 (there being five pulses generated by the input transducer for each yard of material passing the contact wheel).

If it is desired to select a distance base of two yards, the count accumulative period must be doubled or increased to permit the input transducer to generate ten pulses during which time the counter 70 is accumulating counts from the output transducer 5. If a distance base of three yards is selected, the count accumulative period must be increased to permit the input transducer to generate fifteen pulses during which time the counter 70 is accumulating counts from the output transducer 5.

Increasing the distance base and, therefore, the time base, is accomplished by inserting an input integrating scaler 44 (see FIG. 5F) in circuit with the stretch mode gate and the square wave generator and trigger 54. The input integrating scaler 44 includes three SCS's and may be made either a one:two scaler by disconnecting the anode of the third SCS from the anode commons of the other SCS's or a one:three scaler by connecting the anode of the third SCS 44X3 to the anode common of the other SCS's 44X1 and 44X2.

Figure 5F:
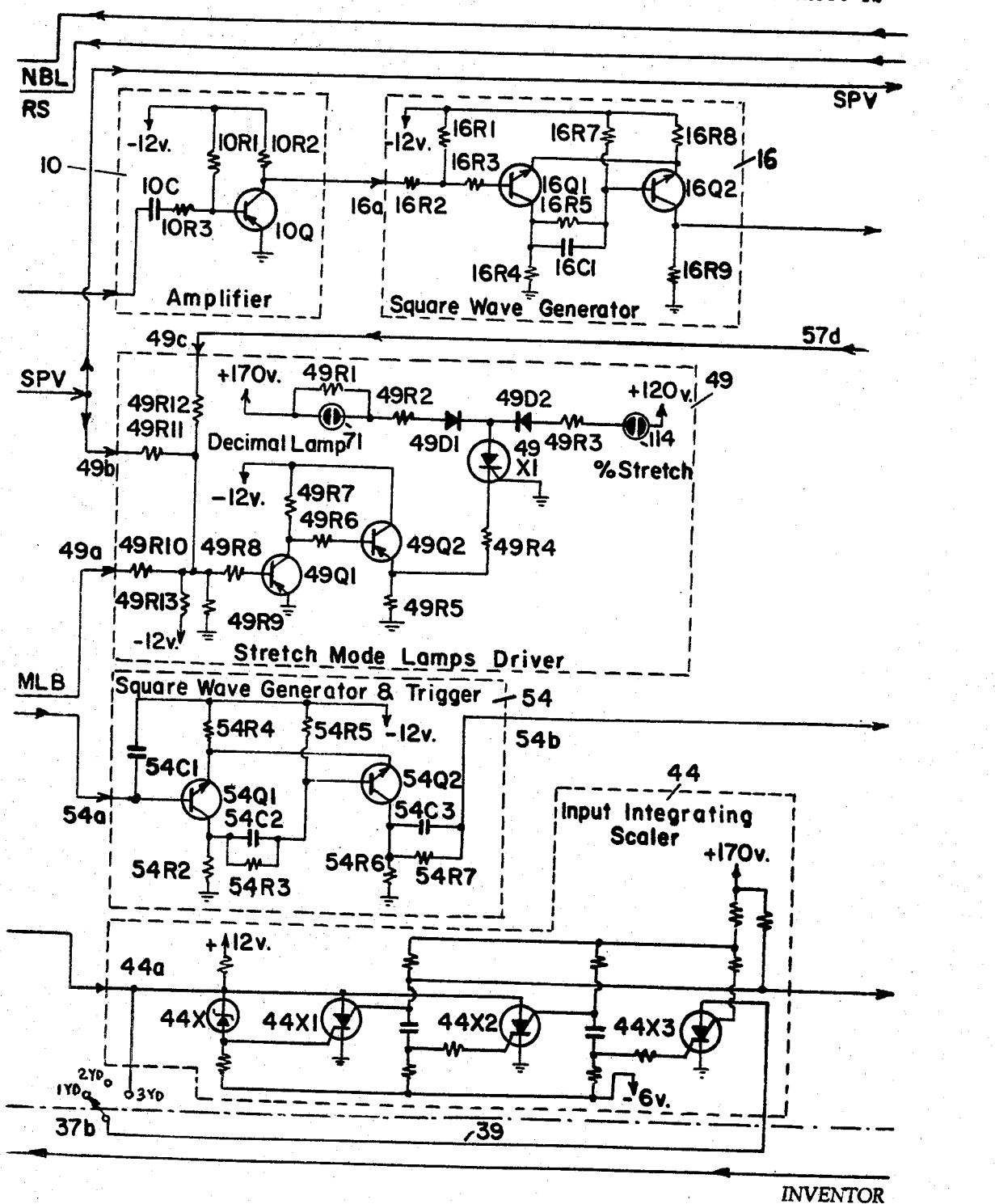

An isolation trigger 40 (see FIG. 5E) is interposed between the stretch mode gate 18 and the input integration scaler 44, and an inverter 50 (see FIG. 5G) is interposed between the output of the integration scaler and the input of the square wave generator and trigger 54 (see FIG. 5F).

Poles 37a of the distance integration switch in the one yard position connects the output terminal 18b of the stretch mode gate over line GSP directly to the input line 54a of the square wave generator and trigger. In the two yard and three yard positions the pole 37a connects the output terminal 18b of the stretch mode gate to the input terminal 40a of the isolation trigger 40.

The isolation trigger 40 comprises an NPN transistor 40Q1 having its base connected directly to the input terminal 40a, its emitter connected to a negative 12 volt source and its collector connected through a resistor 40R1 to ground. An output taken from the collector of the transistor is fed through an RC network, comprising resistor 40R2 and capacitor 40C1 in parallel, to the input terminal 44a of the input integrating scaler 44.

The input integrating scaler 44 comprises a Zener diode 44X, three silicon controlled switches 44X1, 44X2 and 44X3 connected either as a two stage or three stage ring counter by means of the pole 37b of the integration distance switch. The third stage X3 is disconnected from the ring counter except when the pole 37b of the integration distance switch is in the three yard position, at which time the anode of X3 is connected in common with the anode of 44X1 and 44X2. The output from the input integrating scaler is taken from the anode gate of the first SCS stage 44X1 and is fed to the inverter 50.

The inverter 50 (FIG. 5G) comprises a PNP transistor 50Q having its collector connected to a −12 volt DC bus, its emitter connected to ground through resistor 50R3 and its base connected through bias resistor 50R2 to the −12 volt DC bus. The signal from the input integrating scaler is coupled to the inverter through resistor 50R1. The inverter output signal is taken from the emitter terminal of 50Q and fed through resistor 5OR4 to the two yard and three yard contacts selectively engaged by pole 37c of the switch 37.

When the integration distance switch 37 is in the one yard position, the isolation trigger, the input integrating scaler and the inverter are out of circuit with the timing count pulse. The timing count pulse from the stretch mode gate or the speed mode gate are fed directly through pole 37a engaging the one yard position contact to the square wave generator and trigger 54.

When the switch 37 is in the two yard position, the timing count pulses are fed to the isolation trigger through pole 37a. The input integrating scaler divides the timing count by two since the third stage of the input integrating scaler is still out of circuit. Output pulses from the input integrating scaler are fed through the inverter 50 and pole 37c to the square wave generator and trigger 54.

When the integration switch is in the three yard position, counting pulses are fed to the isolation trigger through pole 37a and on to the input integrating scaler 44 whose third SCS stage is now in circuit by reason of its anode being connected through pole 37b to the anodes of the other stages. The input integrating scaler divides the timing count pulses by three and feeds the resultant pulse on to the inverter 50 whose output is then fed through the pole 37c to the square wave generator and trigger 54.

Since the timing count pulses are divided by two or three depending on whether the two yard or three yard distance base is selected, the count pulses, i.e. the pulses being delivered from the output transducer 5, must be divided correspondingly. This is done by means of the output integrating scaler 41 which is identical with the input integrating scaler 44 and needs no further description.

Pole 37d of the integration switch 37 in the one yard and two yard positions is open but in the three yard position it connects the anode of the third SCS stage 41X3 in common with the anodes of the other SCS stages 41X1 and 41X2 of the output integrating scaler. Pole 37e in the one yard position connects the count pulse line 31b from the gated inverting trigger 31 with the count pulse line IC going to the first decade stage 51 of the digital counter 70. In the two yard and three yard positions the pole 37e connects the count pulse line 31b to the anode of the output integrating scaler 41.

Pole 37f in the one yard position is open but in the two yard and three yard positions, it connects the output line from an isolation trigger 45 to the count pulse line IC.

The isolation trigger 45 receives pulses from the output integrating scaler 41 and serves to prevent undesired interaction between the output integrating scaler and the digital counter 70. The isolation trigger 45 is similar to the isolation trigger 58 previously described and, therefore, it needs no further description.

All poles of the integration distance switch are mechanically connected as indicated by the dotted line 39 for simultaneous movement between the three positions of the switch.

Operating mode selectors

The operating mode of the digital computer is selected by the machine operator who manually positions the function switch to one of its three mode positions, namely, stretch, cycling or speed.

The function switch 30 (FIGS. 4B and 5C), as has previously been described, has three pivoted poles 27, 28 and 29 which selectively engage the fixed contacts designated a, b and c associated with each pole. The a contacts are engaged in the stretch position, the b contacts are engaged in the cycling and the c contacts are engaged in the speed position.

The pole 27 in the stretch position supplies stepping pulses originating in the 5MS Multivibrator 42 to the indicating automatic selectable input scaler 17. In the cycling and speed positions the pole 27 is open, there being no circuit connections to contacts b and c.

The pole 28 is open circuited in the stretch and speed positions, but in the cycling position connects stepping pulses from the second stage of a mode timing scaler 33 to isolation trigger 25 which in turn feeds the stepping pulses to the indicating automatic selectable input scaler 17 over input line 17b.

The pole 29 is open circuited in the stretch position. In the cycling position it connects control pulses from the first stage of the mode timing scaler to the input terminal 20a of the mode control switch. In the speed position the pole 29 connects a +12 volt bus through resistor 30R to the input terminal 20a of the mode control switch 20.

The mode control switch 20, as previously described, controls the stretch mode gate 18 and the speed mode gate 19 so that one mode gate is open while the other mode gate is closed. The mode gates are never open simultaneously, but are alternately opened by separate control signals from the mode control switch 20. The mode control switch comprises a PNP transistor 20Q1 and a NPL transistor 20Q2. Transistor 20Q1 has its collector connected to ground through resistor 20R1 and diode 20D in parallel. The diode permits current to flow from ground but not in the opposite direction. The emitter of 20Q1 is connected to a −12 volt DC bus. The base of 20Q1 is connected through load resistor 20R2 to a +170 volt source and to the collector of 20Q2 through resistor 20R3. Control bias for the stretch mode gate 18 and the speed mode lamp gate 56 is taken from the collector of 20Q1 over conductor 20b. The emitter of 20Q2 is connected to ground, and its collector is connected to the +12 volt DC bus. The base of 20Q2 is connected to the pole 29 of the function switch from which it receives control signals. The base of 20Q2 is also connected through capacitor 20C1 to ground. The control bias for the speed mode gate 19 and the input lamps blanking is taken from the collector of 20Q2 over line 20c. Both transistors 20Q1 and 20Q2 are normally off when no voltage is applied to the base of 20Q2. A turn-off voltage then appears on line 20c closing the speed mode gate, while no voltage appears on line 20b permitting the stretch mode gate to open. A positive voltage appearing at the base of 20Q2 will turn it on and the drop in voltage at the emitter of 20Q2 will be coupled through 20R3 to the base of 20Q1 thereby turning 20Q1 on. With both transistors conducting, the turn off bias voltage is removed from the speed mode gate 19 permitting it to open, and turn-off bias is applied to the stretch mode gate 20 to close it.

The mode control switch receives turn on voltage from either the +12 volt DC bus when pole 29 of the function switch is in the speed position, or from the mode timing scaler 33 over line 33a when pole 29 is in the cycling position.

The mode timing scaler 33 (FIG. 5D) comprises four SCS stages 33X1, 33X2, 33X3 and 33X4 and a Zener diode 33X for turning on the first stage 33X1. Stepping pulses are fed to the common anode conductor connecting each stage. Control voltage for the mode control switch is taken from the anode gate of the first stage 33X1 over line 33a. Control voltage for the indicating automatic selectable input scaler 17 is taken from the anode gate of the second SCS stage 33X2 over line 33b. Since the mode timing scaler is basically similar to other scalers included in this invention whose function is generally described with reference to the scaler in the decade counter 51, its operation will be readily apparent.

"Nixie" blanking

The blanking of the "Nixie" count display tubes is controlled in response to signals sent over line 53b from the anode gate in the first stage 53X1 of the count-display timing scaler (FIG. 5H) and applied to the "Nixie" blanking "NOT" 36, which in turn controls the "Nixie" blanking driver 43.

The "Nixie" blanking "NOT" comprises a grounded emitter PNP transistor 36Q1 and a NPN transistor 36Q2. The collector of 36Q1 is connected through load resistor 36R1 to −12 volts and through coupling resistor 36R2 to the base of 36Q2. The base of 36Q1 is connected through base resistor 36R5 to the common junction of resistors 36R3 and 36R4 which are connected in series circuit between −12 volts and ground. The control signal from line 53b is fed through resistor 36R6 to the common junction between 36R3, 36R4 and 36R5. The emitter of 36Q2 is connected to −12 volts, and the collector of 36Q2 is connected through load resistor 36R7 to ground. The output signal from the "Nixie" blanking "NOT" is taken from the collector of 36Q2 and applied through resistor 43R1 to the cathode of a SCR 43X1 in the "Nixie" blanking driver.

When the first stage 53X1 of the count-display timing scaler is on, no turn on voltage appears on line 53b. The "Nixie" blanking "NOT," transistors 36Q1 and 36Q2 are both off, and no turn-on signal is applied to the "Nixie" blanking driver. When 53X1 turns off a turn-on voltage is applied over line 53b to the "Nixie" blanking "NOT," transistors 36Q1 and 36Q2 turn on and a turn-on signal is applied to the cathode of the SCR in the "Nixie" blanking driver turning it on.

The cathode gate of the SCR 43X1 is connected to ground. The anode is connected to the pivoted pole of the single pole on-off blanking switch 46. When the blanking switch is in the on position, the output from the "Nixie" blanking driver is fed to the line NBL, which supplies blanking voltage to the "Nixie" counting tube, and control signals to mode lamps blanking 47, and input lamps blanking 23. In the off position of the blanking switch 46, the output line of the "Nixie" blanking drive is open circuited.

Indicator lamps

The following indicator lamps are provided to indicate various conditions of computer operation.

A decimal lamp, a percent stretch mode lamp, a speed mode lamp, and four input lamps.

The decimal lamp is located on the front panel of the digital counter 70 between the first and second decade stages. It is lighted only when the numerical value of the function being measured is a whole number plus a decimal to the tenths place. Since it is desired to measure percent stretch as a whole number plus a decimal fraction to the tenths place, the decimal lamp and the percent stretch mode lamps are energized by the same control circuit.

The percent stretch lamp is energized only when a percent stretch value is being indicated on the display panel of the digital counter 70. The decimal lamp and the percent stretch are both blanked when the "Nixie" counting tubes are blanked during the count accumulation period, at any time when a function other than percent stretch is being measured, and during reset.

The decimal lamp 71 and percent stretch lamp 114 (FIG. 5F) are each connected in circuit with a silicon controlled rectifier 49X1 between a positive voltage source and ground. The decimal lamp is connected to a +170 volt DC bus on one side and on its other side in series with a 49R2 resistor and diode 49D1 to a junction connected to the anode terminal of the SCR 49X1. A protective resistor 49R1 is connected across the decimal lamp.

The percent stretch lamp is connected on one side to a +120 volt DC bus and on the other side in series with a resistor 49R3 and diode 49D2 to the anode junction of SCR 49X1. The cathode gate of the SCR 49X1 is connected to ground. Its cathode is connected through resistor 49R4 to the collector of a NPN transistor 49Q2 in the stretch mode lamps driver. Transistor 49Q2 is controlled by a PNP transistor 49Q1 which is controlled by control voltages appearing at input terminals 49a, 49b and 49c. Terminal 49a receives a control signal from the mode lamps blanking 49 which is controlled by signals appearing on the "Nixie" blanking line NBL. Terminal 49b receives control signals from mode control switch 20 over line SPV. Terminal 49c receives control signals from the reset gate line 57d.

The base of 49Q1 is connected through a base resistor 49R8 to a junction point. The input terminals 49a, 49b and 49c are connected to the junction through resistors 49R10, 49R11 and 49R12 respectively. The junction is connected to ground through resistor 49R9 and it is connected to a −12 volt DC source through resistor 49R13. The emitter of 49Q1 is connected to ground, and the collector thereof is connected to a −12 volt source through resistor 49R7. The emitter of transistor 49Q2 is connected through resistor 49R5 to ground, and the collector thereof is connected to a −12 volt DC source. Control signals for transistor 49Q2 are applied to its base through resistor 49R6 from the collector of 49Q1. Transistors 49Q1 and 49Q2, SCR 49X1, and the decimal and percent stretch lamps are normally on in the absence of turn-off signals on any one of the input terminals 49a, 49b and 49c.

Speed mode indicator lamp

The speed mode indicator lamp 48LP (FIG. 5D) is on when the digital counter "Nixie" display tubes are indicating speed. It is turned off when the "Nixie" display tubes are blanked, when the stretch mode gate is open, and when a reset signal appears on the reset line RL.

The speed mode lamp 48LP is connected on one side to a +120 volt bus and on its other side in series with a resistor 48R1 to the anode of the speed mode lamp driver SCR 48X. The cathode gate of 48X is connected to ground, and its cathode is connected to the emitter of a gated inverter PNP transistor 52Q.

The gated inverter is controlled by signals applied to the base of transistor 52Q1 through resistors 52R1 and 52R2 from input terminals 52a and 52b respectively. The emitter of 52Q1 is connected to ground through resistor 52R3 and the collector is connected to −12 volts. When 52Q is off the speed mode lamp driver 48 is off and the speed mode indicating lamp is out. The control signal at the input terminal 52a of the gated inverter comes over the MLB line from the mode lamps blanking 47. A turn-on signal is applied when 47Q conducts and a turn-off signal is applied when 47a is off. The control signal at input terminal 52b is taken from the output terminal of the speed mode lamp gate 56.

The speed mode lamp gate 56 comprises a pair of PNP transistors 56Q1 and 56Q2 having their emitters connected to ground and their collectors connected a common load resistor 56R1 to a −12 volt bus. The base of 56Q1 is connected through base resistor 56R7 to the common junction between resistors 56R2 and 56R3 which are connected as a voltage divider in series between the −12 volt bus and ground. The input terminal 56a feeding control signals from the mode control switch 20 is connected through resistor 56R8 to the common junction of resistors 56R7, 56R2 and 56R3. The base of 56Q2 is similarly connected through a base resistor 56R6 to the common junction between resistors 56R4 and 56R5 which are connected in series between the −12 volt bus and ground. The input terminal 56b feeding control signals from the reset line RS is connected through resistor 56R9 to the common junction of resistors 56R4, 56R5 and 56R6. The output signal from the speed mode lamp gate is taken from the common junction between the collectors of 56Q1 and 56Q2.

When no turn-off signals are applied to the terminals 56a or 56b, both transistors 56Q1 and 56Q2 are on. The output voltage at 52b is then substantially at ground potential as a result of the low resistance of the conducting transistors. This is a turn-off signal for the gated inverter 52.

When turn-off voltage is applied to only one of the terminals 56a or 56b, one of the transistors 56Q1 or 56Q2 turns off but the other one which does not receive the turn-off signal continues to conduct. A turn-off output signal continues to be applied to the terminal 52b of the gated inverter.

When turn-off voltage is applied to both terminals 56a and 56b, both transistors 56Q1 and 56Q2 turn off, the output voltage at the collectors goes to −12 volts and provides a turn-on signal at the terminal 52b of the gated inverter 52.

Input lamps blanking

The input lamps DS1, DS2, DS3 and DS4 in the indicating automatic selectable input scaler 17 (FIG. 5B) are blanked at certain times by blanking signals applied from the input lamps blanking circuits 23. The input lamps blanking circuits 23 include a gate comprising PNP transistors 23Q1 and 23Q2, an inverter transistor 23Q3 and a driver 23X1.

Transistors 23Q1 and 23Q2 have their emitters commonly connected to ground, and their collectors commonly connected through resistor 23R9 to −12 volts. The base of 23Q1 is connected through base resistor 23R1 to the junction of series resistors 23R3 and 23R2 connected between −12 volts and ground. The input terminal 23c, which receives control signals from the mode control switch 20, is connected through resistor 23R4 to the junction of 23R1, 23R2 and 23R3. The base of 23Q2 is similarly connected through base resistor 23R5 to the junction of series resistors 23R7 and 23R8 between −12 volts and ground. The input terminal 23a which receives control signals from the reset line RS is connected through resistor 23R8 to the junction of 23R5, 23R6 and 23R7.

The inverter transistor 23Q3 is a PNP transistor having its collector connected to −12 volts, its emitter connected to ground through resistor 23R11 and to the cathode of the lamp driver SCR, 23X1, and its base connected through resistor 23R10 to the junction of 23Ra and the collectors of 23Q1 and 23Q2.

The input lamp driver SCR 23X1 has a cathode gate connected to ground, a cathode connected to ground through 23R12 and 23R11 in series, and an anode connected through resistor 23R13 and diode 23D2 to the input terminal 17a in the indicating automatic selectable input scaler. The input terminal 17a is connected by a bus to one side of all the input lamps DS1, DS2, DS3 and DS4 and to +170 volts DC through resistor 17R1. The input terminal 17a also receives lamp blanking signals from the NBL line through resistor 23R14 and diode 23D1. The diodes 23D1 and 23D2 are connected to permit blanking signals from 23X1 and the NBL line to pass to the input indicator lamps, but to block interchange of current between the NBL line and the input lamp driver 23X1.

When no turn-off signals are applied to the terminals 23a and 23c of the input lamp blanking gate, both transistors 23Q1 and 23Q2 are on. The signal then appearing at the collectors of 23Q1 and 23Q2 is a turn on signal which is applied to the base of the transistor 23Q3. 23Q3 is on due to the voltage drop across 23R9 and the driver 23X1 is on due to the voltage drop across 23R11.

When turn-off voltage is applied to only one of the terminals 23a or 23c, one of the transistors 23Q1, or 23Q2 turn off, but the other one which does not receive the turn-off signal continues to conduct and a turn-on output signal continues to be applied to transistor 23Q3 because of the voltage drop across 23R11.

When turn-off voltage is applied to both terminals 23a and 23c, both transistors 56Q1 and 56Q2 turn off, the output voltage at the collectors then provide a turn-off signal to the transistor 23Q3 which causes it to turn off. The input lamp driver will then turn off and no blanking signal is applied to the input lamps from the input lamp driver 23X1.

The energizing circuit for the input lamps DS1, DS2, DS3 and DS4 can be traced from the +170 volts bus, through resistor 17R1 to one side of each of the input lamps connected in parallel. The other sides of the lamps DS1, DS2, DS3 and DS4 are separately connected to the anode gates of stages X1, X2, X3 and X4 respectively of the input scaler. When any one of the input scaler stages is on, the energizing circuit for a corresponding input lamp will be completed to ground through that stage. If the commonly connected sides of the input lamps are clamped at ground potential by blanking signals applied to terminal 17a from the input lamps blanking circuit 23 or the NBL line, all of the input lamps will be off.

Indicating automatic selectable input scaler

The primary purpose of the indicating automatic selectable input scaler 17 is to automatically and cyclically supply successive gating pulses to the input gates 11, 12, 13 and 14. It also provides means for disconnecting one or more input gates from the automatic cycling system, and provides indicator lamps for indicating which input gate is open.

The scaler circuit comprises four SCS stages X1, X2, X3 and X4. Any stage may be disconnected from the scaler system by means of manual input switches 61, 62, 63 and 64 respectively. When any one stage is disconnected, the next succeeding stage that remains in the scaler system is connected to the next prior stage that remains in the scaler system by means of the arrangement of the manual input switches 61, 62, 63 and 64.

The manual on-off switches 61, 62, 63 and 64 are three pole, two position switches. The poles of each switch are each designated by the letters a, b and c and the two positions are designated OFF and ON. Poles *b* and *c* of each switch are provided to connect or disconnect a given SCS stage to or from the scaler system. The *a* poles of the input switches are in the exciter lamp circuits of corresponding input transducers 1-1, 1-2, 1-3 and 1-4.

Consideration will first be given to the condition of the automatic selectable input scaler when all the manual ON-OFF switches are ON. At the time each of the scaler stages are connected in a four ring counter circuit, each of the SCS's has a cathode gate which is connected to ground, and an anode which is connected through the *b* pole of a corresponding input switch to a common anode line. The anode line is connected to +12 volts through anode resistor 17R6 and to an input triggering pulse line 17*b* receiving triggering pulses from the isolation trigger 25 or the pulse shaping network 24. The cathode gate of X1 is connected to −6 volts through resistor R7 and through the ON position contact pole *c* to the anode of a Zener diode X. The Zener diode is connected between the *b* and *c* poles of input switch 61. Therefore, when 61 is closed, the Zener diode is connected across the cathode gate and anode of X1. The cathode gates of stages X2, X3 and X4 are connected to −6 volts through the series resistors 17R8, 17R9, the series resistors 17R10, 17R11, and the series resistors 17R12 and 17R13 respectively.

The anode gate of X1 is connected to +170 volts through resistors 17R15 and 17R16, to the junction of resistors 17R8 and 17R9 in the next stage X2 through capacitor 17C1, and to the gate bias terminal 11*a* of the input gate 11. The anode gate of X2 is connected to the junction of 17R10 and 17R11 in the next succeeding stage X3 through capacitor 17C2, to the input bias terminal 12*a* of input gate 12, and to a conductor 172 through resistor 17R16. Conductor 172 is connected to the +170 volts through resistor 17R14. The anode gate of X3 is connected to the junction of 17R12 and 17R13 of the next stage X4 through capacitor 17C3, to the gate bias terminal 13*a* of input gate 13, and to the conductor 172 through resistor 17R17. The anode gate of X4 is connected to the gate bias terminal 14*a* of input gate 14, and to the conductor 172 through resistor 17R18. The operation of the scaler is similar to the operation of the other scalers used in the invention and need not be further described except to say that scaler stepping or count pulses are received over line 17*b* and are applied to the common anode line 171.

Since the first stage of the scaler system must be provided with a Zener diode X connected from cathode gate to anode for turning on the first stage, the Zener diode X is connected by the *b* and *c* poles of the input switches 61, 62, 63 and 64 so that it is always connected to the first SCS stage remaining in the scaler system no matter which SCS stages are disconnected. This is done by connecting the Zener diode across poles *b* and *c* in the first stage input switch 61 and by interconnecting the *c* poles of the different input switches in their OFF position so that they are series connected from the *c* pole in switch 61 to the *c* pole in switch 64. The *b* pole of each switch is connected to the common anode conductor 171. The ON position, *b* pole contact of each switch is connected to the anode of a corresponding SCS stage. The OFF position, *b* pole contact of each switch is open. The ON position, *c* pole contact of each switch is connected to the cathode gate of a corresponding SCS stage.

For example, it will be readily apparent that when switch 61 is OFF and switches 62, 63 and 64 are ON, the Zener diode X is then connected from the cathode gate to the anode of SCS X2 via pole *c* of 61, pole *c* of 62, conductor 171 and pole *b* of 62.

Stepping pulse circuits for the indicating automatic selectable input scaler

Stepping pulses for the indicating automatic selectable input scaler originate either in the mode timing scaler 33 or the 5 millisecond monostable multivibrator 42 depending on whether the function switch 30 is in the cycling position or the stretch position.

In the stretch position of the function switch the automatic indicating selectable input scaler 17 is fed stepping pulses from the 5 MS MMV 42 (FIG. 5E) through the inverter 32, pole 27 of the function switch, the pulse shaping network 24, and input line 17*b*.

The 5 MS MMV 42 comprises PNP transistors 42Q1 and 42Q2 having their emitter grounded, and their collectors connected through resistors 42R7 and 42R4 respectively to −12 volts. The base of 42Q1 is connected through resistor 42R6 to +12 volts, and through capacitor 42C1 to the junction of resistors 42R1 and 42R5 which are connected in series between −12 volts and ground. The reset line RS feeds reset trigger pulses to the junction of 42R1 and 42R5 through resistor 42R8. The output signal from the collector of 42Q1 is coupled via capacitor 42C2 to the base of 42Q2. The base of 42Q2 is also connected through resistor 42R2 to −12 volts. The output from the collector of 42Q2 is fed to the inverter 32 and through feed back resistor 42R3 to the base of 42Q1. The operation of the 5 MS MMV will subsequently be described under the heading "Circuit Analysis."

The inverter 32 comprises a NPN transistor 32Q1 having its collector connected to ground through resistor 32R1, its emitter connected to −12 volts and its base connected through bias resistor 32R3 to −24 volts. The signal from the 5 millisecond multivibrator is fed to the base of 32Q1 through a coupling network comprising capacitor 32C1 and resistor 32R2 in parallel.

The output signal taken from the collector of the transistor 32Q1 is fed to separate pulse shaping networks 24 and 34 which comprise a resistor 24C1 and capacitor 24R1 in parallel, and a resistor 34R1 and capacitor 34C1 in parallel respectively. The pulse shaping networks 24 and 34 sharpen the pulses received from the inverter 32 and feed them to the indicating automatic selectable input scaler 17 and the mode timing scaler 33 respectively.

In the stretch mode the (stepping) pulses (which are) fed from the 5 MS MMV, via the inverter 32 and the pulse shaping network 24 control the indicating automatic selectable input scaler.

With the function switch in the cycling position stepping pulses which are fed from the 5 MS MMV via inverter 32 and pulse shaping network 34, control the mode timing scaler 33. The mode timing scaler in turn provides one stepping pulse for every four pulses received to the indicating automatic selectable input scaler 17 through pole 28 of the function switch and the isolation trigger 25.

Circuit analysis

Since the operation of the unit is controlled by several switches, it will be necessary to analyze the circuit under different conditions. The first conditional analysis will be necessarily quite long and complex with each successive analysis merely pointing out the differences. The following are the different conditions for which one complete cycle will be discussed, refer to FIGS. 4A through 4C and FIGS. 5A through 5I.

(1) Function switch 30 in stretch position, integration distance switch 37 in 1 yard position, blanking switch 46 in ON position, and input No. 1 switch 61 in ON position. All other input switches in OFF position.

(2) Same as No. 1 except all input switches 61–64 in ON position.

(3) Same as No. 1 except integration distance switch 37 in 2 yard position.

(4) Same as No. 1 except integration distance switch 37 in three yard position.

(5) Same as No. 1 except function switch 30 in speed position.

(6) Same as No. 1 except function switch 30 in cycling position.

(7) Same as No. 1 except function switch 30 in cycling position, and all input switches in ON position.

(8) Blanking switch 46 in OFF position (effect on associated circuitry only).

For all above conditions it will be assumed that the circuit has been placed in operation and one (1) complete cycle has been made with the circuit in the reset position. Each reference to circuit conditions will assume that the transducers are, at that instant, stopped. Furthermore, it will be assumed that during each analysis of one (1) cycle, the material contains zero percent stretch.

In order to simplify the following discussions, connecting lines entering circuit blocks with arrow points pointing toward blocks indicate signal inputs. Connecting lines without arrow points at circuit blocks indicate signal outputs.

Conditional analysis No. 1

With switches positioned as specified in Circuit Analysis No. 1, and with the circuit in the reset position the following conditions exist.

(1) In the indicating automatic selectable input scaler 17, X1 is on. X2, X3 and X4 are off.

(2) Input No. 1 gate 11 is open (no turn-off signal at 11a).

(3) Input No. 2 gate 12, input No. 3 gate 13 and input No. 4 gate 14, are all closed (turn-off signal present at 12a, 13a and 14a).

(4) In the mode control switch 20, transistors 20Q1 and 20Q2 are both off. Therefore, output signal is present at 20c and no output signal is present at 20b.

(5) Stretch mode gate 18 is open (no turn-on signal at 18a).

(6) Speed mode gate 19 is closed (turn-on signal present at 19a).

(7) In the divide-by-5 timing scaler 59, X5 is on. X1, X2, X3 and X4 are off.

(8) In the count-display timing scaler 53, 53X3 is on. 53X1 and 53X2 are off.

(9) In the reset gate 57, both 57Q1 and 57Q2 are off (no turn-on signal at either 57a or 57b). Therefore, no output signal is present at 57c. However, output signal is present at 57d.

(10) In the speed mode lamp gate 56, both 56Q1 and 56Q2 are on (no turn-off signal at either 56a or 56b).

(11) In the "Nixie" blanking "NOT" 36, both 36Q1 and 36Q2 are off. Therefore, no output signal is present going to "Nixie" blanking driver 43.

(12) "Nixie" blanking driver 43 is off.

(13) In the mode lamps blanking 47, 47Q1 is on due to the input turn-on signal from NBL derived from +170 v. through 72R1 and the diode 74 in each "Nixie" scaler 51, 55 and 60, since the SCR 43X1 in "Nixie" blanking driver 43, is off.

(14) In the gated inverter 52, the transistor 52Q is off (no turn-on signal at 52b). Therefore, no output signal is present going to speed mode lamp driver 48.

(15) Speed mode lamp driver 48 is off.

(16) In the input lamps blanking 23, 23Q1 is off (turn-off signal present at 23c), and 23Q2 is on (no turn-off signal at 23a). Therefore, 23Q3 is on due to the voltage drop across 23R9 and 23X1 is on due to the voltage drop across 23R11.

(17) In the indicating automatic selectable input scaler 17, 17a is at ground potential, thereby causing neon indicator lamp DS1 to to be off.

(18) In the stretch mode lamps driver 49, 49Q1, 49Q2 and 49X1 are off (turn-off signal present at 49c). Therefore, the decimal lamp and the percent stretch lamp are off.

(19) In the amplifier 10, 10Q is on due to turn-on bias current through 10R1. This condition is valid under standing conditions due to the capacitor, 10C, coupling. When AC input is present, 10Q is turned off and on due to the charging and discharging of the capacitor 10C.

(20) In the square wave generator 16, 16Q1 is on and 16Q2 is off. 16Q1 is held on by the voltage drop across 16R1, this resistor being essentially in parallel with 10R2 in amplifier 10. Square wave generator 16 comprises a basic Schmitt trigger, operation of which is assumed to be understood.

(21) In the gated inverter 22, 22Q is on, being held on by the voltage at 22b this voltage appearing from the collector of 16Q2 in the square wave generator 16, to −12 v. 22Q, in the gated inverter 22, is operating in the inverted configuration with the input appearing from 22b to −12 v. No turn-off signal appears at 22a.

(22) In the pulse generators 26 and 21, transistors 26Q and 21Q are on, both being held on by turn-on bias currents through resistors 26R1 and 21R1 respectively. The coupling capacitors 26C1 and 21C1 block the DC conditions present at 22c and 21a.

(23) In the gated inverting trigger 31, 31Q1 and 31Q2 are off (turn-off signal present at 31a), Therefore, no voltage drop appears across 31R7.

(24) In the 5 MS MMV 42 (5 milliseconds monostable multivibrator), 42Q1 is off and 42Q2 is on. At the instant that the circuit was placed in the reset position, the positive voltage at RS dropped to zero, thereby removing input signal from the 5 MS MMV 42. At that time, 42Q1 was off and 42Q2 was on. When the input signal dropped to zero, 42Q1 turned on due to the bias current from −12 v. through 42R1 and 42C1. Once charged, 42C1 blocked further bias from 42Q1. When 42Q1 turned on, 42Q2 turned off, thereby biasing 42Q1 on through 42R3. This condition existed until 42C2 had charged through 42R2 for approximately 5 milliseconds. The charge on 42C2 then turned 42Q2 on which, in turn, removed the bias from 42Q1 allowing it to turn off. Therefore, after approximately 5 milliseconds in reset, the conditions, as first stated, now exist.

(25) In the inverter 32, 32Q1, operating in the inverted configuration, is on, being held on due to the voltage drop across 42R4 in the 5 MS MMV 42. During the time that 42Q2 in the 5 MS MMV 42 was off, 32Q1, in the inverter 32 was off. When 32Q1 turned on, following the 5 millisecond delay, output voltage reappeared and was fed via function switch 30, pole 27, to the pulse shaping network 24.

(26) Pulse shaping network 24 is inactive, with no output signal present. However, at the instant that 32Q1, in in the inverter 32, turned on following the 5 millisecond delay, the pulse shaping network 24, differentiated the rising voltage at 24a into a sharp pulse and fed it on to the indicating automatic selectable input scaler 17, at 17b. The purpose of this negative pulse was to momentarily drop the anode holding voltage to the then on SCS in the scaler, thereby triggering the next input position. However, since the original conditional analysis called for input No. 1 switch 61, to be on and all others to be off, the scaler cannot advance. Therefore, after the output pulse from the pulse shaping network 24 had dissipated, X1 in the scaler turned on again maintaining input No. 1 gate 11 open, as originally stated in No. 2.

(27) In the mode timing scaler 33, X2 is on. X1, X3 and X4 are off. When the circuit was first placed in operation, prior to making one complete cycle ending in the reset position, X1 was turned on by the Zener diode X. When the circuit advanced to the reset position, the inverter 32, which turned on following the 5 millisecond delay, caused output voltage to be fed to pulse shaping network 34, in addition to being fed to pulse shaping network 24. The rising voltage, entering pulse shaping network 34, was thereby differentiated into a sharp negative pulse and fed on to the mode timing scaler 33, causing X1 to turn off and X2 to turn on. Therefore, with X2 on, voltage output appears at 33a but not at 33b. However, since function switch 30 is in the stretch position, the output signal status of either of these outputs has no bearing on the operation of the remainder of the circuit.

(28) In the "Nixie" scalers 51, 55 and 60, all SCS's are off due to the absence of DC latching voltage at RS. Therefore, all "Nixie" tubes 72 are off or blanked, since no anode gate can drop to ground potential. The transistors 75Q1 in the "Nixie" scalers are off due to the turn-off signals present at the anode gates of the last stages.

At this point, all conditional circuit blocks have been discussed. There remains, however, several blocks whose functions during reset are immaterial, but which, nonetheless, are essential to the operation of the circuit. These blocks, along with all others, will be discussed during the one (1) cycle analyses wherein their purposes will be made clear.

Assume that both input transducer No. 1–1 and the output transducer 5 advance exactly one revolution. A revolution starts at the instant the input transducer delivers a change in output sufficient to turn amplifier 6 off, thereby providing signal to input No. 1 gate 11. This is accomplished by the silk-screened plastic disc in the input frequency transducer turning, such that the light from the exciter lamp is blocked from the photocell 110. This causes the transistor 111 in the frequency transducer 1 to turn off, removing output voltage from terminal 2. As the plastic disc 108 continues to turn, light is allowed to strike the photocell 110 during the second half of the revolution. This turns the transistor 111 on, producing output voltage across the resistor 112. Amplifier 6, therefore, turns on, removing input signal to input No. 1 gate 11. The signal from the input No. 1 gate 11, appearing during the first half of the transducer's revolution, is fed to the stretch mode gate 18. This gate being open in the absence of control signal at 18a passes the signal on via output at 18b to integration distance switch 37, pole 37a to the square wave generator and trigger 54. One sharp pulse is fed from the square wave generator and trigger 54 to the divide-by-5 timing scaler 59 causing it to change position (X5 turns off and X1 turns on). At the instant that X5 turned off, positive turn-off signal was re-established at the input to isolation trigger 58 causing it to deliver one pulse to the count-display timing scaler 53, therein causing it to change position (53X3 turns off and 53X1 turns on). With X5 in the divide-by-5 timing scaler 59 and 53X3 in the count-display timing scaler 53, both off, positive voltage now appears at 57a and 57b. This turns 57Q1 and 57Q2 on in the reset gate 57 and removes output signal at 57d. Output signal now appears at 57c thereby providing DC latching voltage at RS on all "Nixie" scalers. This, in turn, allows the "Nixie" scaler Zener diodes X to turn on the first stages establishing the zero figure on all "Nixie" tubes. The simultaneous removal of voltage at 53b and at 57d causes the following changes in the circuit to occur:

(1) 36Q1 and 36Q2 in the "Nixie" blanking "NOT" 36 turn on in the absence of turn-off input signal.

(2) "Nixie" blanking driver 43, therefore, turns on and clamps NBL via blanking switch 46 to ground potential.

(3) This places the anodes of the "Nixie" tubes at ground potential thereby preventing the zero figures from appearing. The first stages of the "Nixie" scalers 51, 55 and 60, however, are still on, since this anode clamping has no effect on the operation of the scaler other than to prevent the "Nixie" tubes from visually displaying the appropriate figures.

(4) In the gated inverting trigger 31, 31Q1 and 31Q2 are off even without turn-off signal at 31a. However, output signal will now appear across 31R7 if the input 31c is fed pulses from pulse generators 26 and 21.

(5) Since NBL is at ground potential, 47Q1, in the mode lamps blanking 47, is off due to the base turn-off signal from −12 v.

(6) The stretch mode lamps driver 49 does not change state even with no signal now at 49c. Turn-off signal now appears at 49a due to 47Q1, in the mode lamps blanking 47, turning off.

(7) In the input lamps blanking 23, 23Q1 is off (turn-off signal present at 23c), and 23Q2 is off (turn-off signal present at 23a). Therefore, 23Q3 is off due to no voltage across 23R9. SCR 23X1 is off due to no voltage across 23R11.

(8) In the indicating automatic selectable input scaler 17, neon indicator lamp DS1 is off, due to NBL being at ground potential, thereby causing 17a to be at ground potential.

Therefore, after one revolution of the input transducer 1–1, all mode lamps are off, all "Nixie" tubes are blanked, and the gated inverting trigger 31 is open to receive counts from the pulse generators 26 and 21.

During the one revolution of the input transducer 1–1, the output transducer 5 is also making one revolution, thereby delivering 100 cycles to the amplifier 10. This signal, amplified by amplifier 10, is fed into square wave generator 16. The output from the square wave generator 16 is simultaneously coupled to the gated inverter 22 and to the pulse generator 21. The pulse generator 21 delivers sharp pulses derived from the rising edge of the square wave output signal from the square wave generator 16. The gated inverter 22 inverts the square wave output signal from the square wave generator 16 and feeds the inverted signal to the pulse generator 26 where sharp pulses are derived from the rising edge of the square wave. These pulses are, therefore, equivalent to pulses taken from the falling edge of the square wave signal from the square wave generator 16. The output pulses from pulse generators 26 and 21 are combined and fed to the gated inverting trigger 31 where, in the absence of turn-off signal at 31a, they are inverted and shaped to approximately 10 microseconds width and then coupled via integration distance switch 37, pole 37e, to the "Nixie" scaler 51. Here, the blanked "Nixie" scalers accumulate the pulses as counts and after one revolution the total equals 100×2 or 200.

During the next revolution of both transducers, each delivers the same number of cycles as during the previous revolution. The divide-by-5 timing scaler 59 changes position (X1 turns off and X2 turns on), due to the pulse delivered from square wave generator and trigger 54. However, since no change occurs in the output of the divide-by-5 timing scaler 59, no change occurs in the circuits beyond this point. The 100 cycle signal, delivered from the output transducer, is again amplified and converted to a square wave, wherein sharp pulses are derived from both rising and falling edges of the square wave. These are again combined, inverted, finally shaped, and passed on to the "Nixie" scalers 51, 55 and 60 where the accumulated total is now 400.

The same action takes place during the next two revolutions of the transducers, and after exactly four revolutions the accumulated total in the "Nixie" scalers is 800.

During the fifth revolution of the transducers the "Nixie" scalers again receive 200 counts, bringing their total now to exactly 1000 counts, and the divide-by-5 timing scaler again changes position (X4 turns off and X5 turns on). This latter change results in 58Q1 in the isolation trigger 58 turning on due to the absence of input turn-off signal and the presence of turn-on bias through 58R2. This causes the collector of 58Q1 to be clamped to ground potential. Therefore, no output pulse is delivered from the isolation trigger 58. No change occurs in the reset gate 57 even without turn-on signal at 57b, since turn-on signal is maintained at 57a, so no further changes in the circuit occurs.

At the instant that revolution number 6 begins, the divide-by-5 timing scaler again changes position (X5 turns off and X1 turns on). The re-establishment of positive turn-off signal at the output of the divide-by-5 timing scaler 59 causes 58Q1, in the isolation trigger 58, to turn off, thereby delivering a pulse to the count-display timing scaler 53. This causes the count-display timing scaler to change position (53X1 turns off and 53X2 turns on). This results in output signal now appearing at 53b and the following related circuit changes occur:

(1) 36Q1 and 36Q2 in the "Nixie" blanking "NOT" 36 turn off due to the input turn-off signal.

(2) "Nixie" blanking driver 43, therefore, turns off, removing the ground clamp to NBL.

(3) This removes the anodes of the "Nixie" tubes from ground potential, thereby permitting the tubes to visually display the appropriate figures.

(4) In the gater inverting trigger 31, 31Q1 and 31Q2 are off due to the high turn-og signal at 31a. This turn-off signal prevents the turn-on of 31Q1 and 31Q2 even in the presence of input pulses from pulse generators 26 and 21. Therefore, no further pulses can be coupled to the "Nixie" scalers.

(5) Since NBL is no longer at ground potential, 47Q, in the mode lamps blanking 47, is on due to the input turn-on signal from NBL derived from +170 v. through 72R1 and diode 74 in "Nixie" scalers 51, 55 and 60.

(6) In the stretch mode lamps driver 49, 49Q1, 49Q2 and 49X1 are on due to no input turn-on signal at 49a, 49b, or 49c. Therefore, the decimal lamp 71 and the percent stretch lamp are both on.

(7) In the input lamps blanking 23, no changes occur except at 23b. Since NBL is no longer at ground potential 23b is not at ground potential.

(8) In the indicating automatic selectable input scaler 17, neon indicator lamp DS1 is on due to NBL and hence 17a not being at ground potential.

Therefore, at the start of revolution number 6, the computing time interval is now complete with the unit displaying 00.0 percent stretch at input No. 1. The gated inverting trigger 31 is closed to prevent further transmission of pulses to the "Nixie" scalers. The display time interval now starts and will continue for the next nine revolutions of the transducers, after which a total of 14 revolutions will have been completed. The fifteenth revolution initiates reset since both X5 in the divide-by-5 timing scaler 59 and 53X3 in the count-display timing scaler 53 will be on. One complete cycle for conditional analysis No. 1 is now complete.

Conditional analysis No. 2

With switches positioned as specified in circuit analysis, No. 2, and with the circuit in the reset position, the conditions, as listed under Circuit Analysis No. 1, apply here with the exception of condition number 1 which now is as follows:

(1) In the indicating automatic selectable input scaler 17, X2 is now on with X1, X3 and X4 off. At the time the circuit was first placed in operation, prior to making one complete cycle ending in the reset position, X1 was turned on by the Zener diode 17X. When the circuit advanced to the reset position, the inverter 32, which turned on following the 5 millisecond delay, caused output voltage to be fed to pulse shaping network 34. The sharp negative pulse, therein derived, was fed into the input to the indicating automatic selectable input scaler 17 at 17b, causing X1 to turn off and X2 to turn on.

Therefore, the only difference is that the selectable scaler in the indicating automatic selectable input scaler 17 is now active. Operation is identical to that described under conditional analysis No. 1, except that after each cycle, as the unit returns to the reset position, the input scaler advances to the next input, thereby providing automatic cycling of the inputs. Any of the input switches can be turned off and the unit will cycle the remaining on switches. With all input switches on, it is necessary to make 4 complete cycles before the operation is completely repeated.

Conditional analysis No. 3

With switches positioned as specified in circuit analysis No. 3, and with the circuit in the reset position, the conditions as listed under conditional analysis No. 1 apply here with the following additions, hereby beginning with number 29.

(29) In the isolation trigger 40, 40Q, operating in the inverted configuration, is off due to no voltage drop across 18R3 in the stretch mode gate 18, since 18Q, in the stretch mode gate 18, is held off by the bias signal through 18R2.

(30) In the input integrating scaler 44, 44X2 is on. 44X1 and 44X3 are off. The anode of 44X3 is disconnected, thereby preventing it from operating in the scaler. When the circuit was first placed in operation, prior to completing one cycle ending in the reset position. 44X1 was turned on by the Zener diode 44X. After one complete cycle (15 revolutions of the transducers), 44X2 is now on.

(31) In the inverter 50, 50Q is off due to the input turn-off signal from the input integrating scaler 44.

(32) In the output integrating scaler 41, either 41X1 or 41X2 could be on with no ill effect on the circuit operation. For purpose of discussion, assume 41X2 is on. 41X3 cannot be on due to its anode being disconnected and, therefore, cannot operate in the scaler.

(33) In the isolation trigger 45, 45Q is off due to the input turn-off signal from the output integrating scaler 41.

Therefore, the only difference between the conditions for conditional analysis No. 1 and No. 3 is that two 2 to 1 scalers have been added, one in the input line and one in the output line. The operation is identical except that the time of operation of the circuit is doubled, since both transducers, via the internal circuitry, effectively have their frequency rate cut in half. Now, instead of obtaining a total of 1000 counts every yard, the distance required is two yards.

Conditional analysis No. 4

The operation of the circuit is now similar to that explained under conditional analysis No. 3 except that, since the anodes of the silicon controlled switches 44X3 and 41X3 in the input and output integrating scalers 44 and 41 respectively are now connected to the anode commons of the other SCS's, the scalers now provide a 3 to 1 division of the incoming signals so as to yield an integrating distance of 3 yards. All other circuit operations are identical to those as presented under conditional analysis No. 1.

Conditional analysis No. 5

With switches positioned as specified in circuit analysis No. 5 and with the circuit in the reset position, the conditions as listed under conditional analysis No. 1 apply here with the exception of numbers 1, 2, 3, 25, 26 and 27, which are omitted, numbers 4, 5, 6, 10, 16, 18 and 21 which are revised, and additional condition number 29. The new and revised conditions are as follows:

(4) In the mode control switch 20, 20Q1 and 20Q2 are both on due to the input turn-on signal through function switch 30, pole 29 from +12 v. Therefore, output signal is present at 20b and no output signal is present at 20c.

(5) Stretch mode gate 18 is closed (turn-on signal at 18a).

(6) Speed mode gate 19 is open (no turn-on signal at 19a).

(10) In the speed mode lamp gate 56, 56Q1 is off (turn-off signal present at 56a), and 56Q2 is on (no turn-off signal present at 56b).

(16) In the input lamps blanking 23, 23Q1 and 23Q2 are on (no turn-off signal present at 23c or at 23a). Therefore, 23Q3 is on due to the voltage drop across 23R9, and 23X1 is on due to the voltage drop across 23R11.

(18) In the stretch mode lamps driver 49, 49Q1, 49Q2 and 49X1 are off (turn-off signal present at 49b and 49c). Therefore, decimal lamp 71 and percent stretch lamp 114 are off.

(21) In the gated inverter 22, 22Q1 is on, being held on by the signal at 22b and by the high positive signal at 22a. This signal at 22a prevents 22Q1 from turning off even without turn-on signal at 22b.

(29) The speed time-base oscillator 15 consists of a uni-junction transistor 15Q1 operating in the relaxation oscillator mode driving a bistable multivibrator to yield a fixed frequency square wave oscillator. The output is coupled to the speed mode gate 19.

The purpose of the speed time-base oscillator 15 is to replace the varying frequency signal from the input transducers with a fixed frequency signal when speed is being measured. The fixed frequency oscillator performs the same function as the input transducers, that being to open and close the gated inverting trigger 31 and in all related ways completely control the operation of the circuit. The operation of the circuit conforms to the operation under conditional analysis No. 1 with the following exceptions:

After the signal from the speed time-base oscillator 15 passes through the now open speed mode gate 19, it takes the same route as the signal from the stretch mode gate 18 during prior analyses, and operates the divide-by-5 timing scaler 53 as before. The only differences occurring during operation are associated with the mode control switch 20 and its related circuitry. These differences occur after the circuit has passed through the computing time interval, and enters the display time interval as denoted by the positions of the divide-by-5 timing scaler 59 and the count-display timing scaler 53. In the divide-by-5 timing scaler 59, X1 is on and in the count-display timing scaler 53, X2 is on. The following pertinent circuit conditions now exist:

(1) In the "Nixie" blanking "NOT" 36, 36Q1 and 36Q2 are both off due to the turn-off input signal from 53b.

(2) Therefore, "Nixie" blanking driver 43 is off, thereby removing the ground clamp to NBL.

(3) This removes the anodes of the "Nixie" tubes from ground potential, thereby permitting the numerical read-out tubes 72 to display the appropriate figures.

(4) In the gated inverting trigger 31, 31Q1 and 31Q2 are both off due to the high turn-off signal at 31a. This turn-off signal prevents the turn-on signal of 31Q1 and 31Q2 even in the presence of input pulses from pulse generator 21. Therefore, no further pulses can be coupled to the "Nixie" scalers 51, 55 and 60.

(5) Since NBL is no longer at ground potential, 47Q in the mode lamps blanking 47, is on due to the input turn-on signal from NBL derived from +170 v. through 72R1 and diode 74 in "Nixie" scalers 51, 55 and 60.

(6) In the stretch mode lamps driver 49, 49Q1, 49Q2 and 49X1 are all off due to the input turn-off signal at 49b. Therefore, the decimal lamp 71 and the percent stretch lamp 114 are both off.

(7) In the input lamps blanking 23, 23Q1 is on (no turn-off signal at 23c) and 23Q2 is off (turn-off signal present at 23a). Therefore, 23Q3 is on and 23X1 is on.

(8) In the indicating automatic selectable input scaler 17, all neon indicator lamps are off (DS1 through DS4) due to 17a being clamped at ground potential.

(9) In the speed mode lamp gate 56, 56Q1 and 56Q2 are both off due to the turn-off signals at inputs 56a and 56b.

(10) Therefore, in the gated inverter 52, 52Q is on due to the input turn-on signal at 52b and no input turn-off signal at 52a.

(11) In the speed mode lamp driver 48, 48X is on, thereby turning the y.p.m. lamp 48LP on.

Therefore, at the start of speed time-base oscillator, cycle number 6, the computing time interval is now complete with the unit displaying yards per minute. The completion of the display time interval is the same as discussed under conditional analysis No. 1 except that oscillator cycles now replace input transducer revolutions.

Conditional analysis No. 6

With switches positioned as specified in circuit analysis No. 6, and with the circuit in the reset position, the conditions as listed under conditional analysis No. 1 apply here with the exception of numbers 4, 25, 26 and 27, which are revised, and numbers 5, 6, 10, 16, 18 and 21, which are the same as listed under conditional analysis No. 5. The revised conditions are as follows:

(4) In the mode control switch 20, 20Q1 and 20Q2 are both on, due to the input turn-on signal through function switch 30, pole 29 from mode timing scaler 33, output 33a. Output appears at 33a on the mode timing scaler 33, due to X2, therein, being on, as will be pointed out in circuit condition number 26 below.

(25) In the inverter 32, 32Q1, operating in the inverted configuration, is on, being held on due to the voltage drop across 42R4 in the 5 MS MMV 42. During the time that 42Q2 in the 5 MS MMV 42 was off, 32Q1 in the inverter 32 was off. When 32Q1 turned on, following the 5 millisecond delay, output voltage reappeared and was fed into pulse shaping network 34, wherein a sharp negative pulse was derived and fed to the mode timing scaler 33.

(26) In the mode timing scaler 33, X2 is on. X1, X3 and X4 are off. When the circuit was first placed in operation, prior to making one complete cycle ending in the reset position, X1 was turned on by the Zener diode X. When the circuit advanced to the reset position, the 5 millisecond delayed pulse from pulse shaping network 34 thereby caused X1 to turn off and X2 to turn on. This action resulted in output voltage apearing at 33a and output voltage dropping to zero at 33b.

(27) In the isolation trigger 25, 25Q1 is on, being held on by bias signal through 25R1 from −12 V. in the absence of input turn-off signal from mode timing scaler 33, output 33b, via function switch 30, pole 28. At the instant the circuit arrived at the reset position, 25Q1 in the isolation trigger 25 was off, since X2 in the mode timing scaler 33 was off, thereby producing positive output voltage at 33b. Following the 5 millisecond delayed pulse, X2 turned on, removing the output at 33b and permitting 25Q1 in the isolation trigger 25 to turn on. This turn-on action of Q1 caused a sharp negative pulse to be transmitted through the parallel combination of 25R2 and 25C1 to input 17b on the indicating automatic selectable input scaler 17. The purpose of this pulse was to momentarily drop the anode holding voltage to the then on SCS in the scaler 17, thereby triggering the next input position. However, since conditional analysis No. 6 called for input No. 1 switch 61 to be on and all others to be off the scaler cannot advance and, therefore, X1 remained on. It will be noted that the action of the mode timing scaler 33 switching to position 2 (X2 on), thereby resulting in the transmission of the pulse to 17b, also produced voltage at 33b, causing mode control switch 20 to change state, placing the circuit in the speed mode, as discussed under conditional analysis No. 5.

Therefore, it can be seen that the operation of the circuit here is a combination of the operations described under conditional analysis No. 1 and conditional analysis No. 5, wherein each time the circuit advances to the reset position, the progressive stepping of the mode timing scaler 33 causes the mode control switch 20 to lock the entire circuit in either the stretch mode, as evidenced by X1 in the mode timing scaler 33 being on, or in the speed mode, as evidenced by either X2, X3 or X4, in the mode timing scaler 33 being on. There then occurs 1 stretch cycle followed by 3 speed cycles and this pattern is repeated continually.

Conditional analysis No. 7

In accordance with the switch requirements listed under Circuit Analysis No. 7, the only difference here is that all input switches are on. Referring to circuit condition number 27 under conditional analysis No. 6, it can be seen that, if more than one input switch is on, the pulse delivered to input 17b on the indicating automatic selectable input scaler would cause the scaler to advance to the next on input. At the same time, the mode control switch 20 would lock the circuit in the speed mode, whereby, after 3 speed cycles, the mode timing scaler 33 would reposition the mode control switch to the stretch mode, thereby providing the connections from the then ON input through the then ON stretch mode gate 18 to the remainder of the circuit. This process would then repeat, yielding one stretch cycle, from one input, followed by three successive speed cycles, followed in turn by one stretch cycle from the next input, then again by three speed cycles until all ON inputs had been cycled. The entire pattern would then repeat continually.

Conditional analysis No. 8

As specified under circuit analysis No. 8, blanking switch 46 is off. The effects on related circuitry apply only when the circuit is in the computing time interval as evidenced by 53X1 in the count-display timing scaler 53 being on and hence, via the "Nixie" blanking "NOT" 36, the "Nixie" blanking driver 43 being on. When the circuit is in the display time interval, the "Nixie" blanking driver 43 is off. Therefore, it is immaterial whether blanking switch 46 is off or on. However, during the computing time interval, if the switch is off, the NBL is no longer clamped to ground potential. This removes the ground clamp on the anodes of the Nixie tubes and permits them to display the ascending total for either stretch or speed. Also 47Q in the Mode Lamps Blanking 47 turns on due to the turn-on signal derived from +170 v. through 72R1 and diode 74 in each of the Nixie Scalers 51, 55, and 60. This causes the output voltage from the Mode Lamps Blanking 47 to drop to near zero, thereby removing turn-off input signal from 49a on the Stretch Mode Lamps Driver 49 from 52a on the Gated Inverter 52. If the circuit were in the Speed Mode, this would allow 52Q, in the Gated Inverter 52, to turn on due to turn-on input at 52b, thereby providing output voltage to the Speed Mode Lamp Driver 48, turning the YPM lamp on. If the circuit were in the Stretch Mode, the absence of turn-off input signal at 49a, on the Stretch Mode Lamps Driver 49, would allow the decimal lamp and the percent STRETCH lamp to turn on due to the absence of the turn-off input signal at 49b and 49c. Also, if the stretch mode and with NBL no longer clamped to ground potential, input 17a on the indicating automatic selectable input scaler 17, would no longer be clamped to ground potential, thereby permitting the appropriate input transducer lamps (DS1, DS2, DS3 or DS4) to turn on, indicating the input from which percent stretch was being computed. Therefore, the blanking switch 46 offers a means for visually monitoring the accumulating data along with the operating mode, and the input status or complete elimination of any visual display until the computing is complete.

Now that all conditional analyses are complete, there remains one part of the circuit not previously discussed, that being the circuitry associated with the transducer lamps ON lamp (FIG. 5E, top right) and the resistors 17R19 through 17R22 in the indicating automatic selectable input scale 17. All transducer exciter lamps 109 (FIG. 2) are wired in series along with the transducer lamps ON lamp. If any exciter lamp in any transducer failed, all other exciter lamps 109 would turn off also, thereby stopping the operation of the circuit. The visual presence of the transducer lamps ON lamp provides means for monitoring the status of the transducers. The resistors 17R19 through 17R22 in the indicating automatic selectable input scaler 17 are connected to switches 61 through 64. If any input is not in use (either turned off or no transducer connected), the resistance, which is equal to the transducer lamp resistance, maintains the original series connection and permits normal operation.

While in the foregoing there has been described and shown the preferred embodiments of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

I claim:

1. A digital computer for computing the percent elongation of material being treated in a processing machine comprising:
input pulse generating means for generating pulses corresponding to units of length of the material entering the processing machine,
output pulse generating means for generating pulses corresponding to units of length of the material leaving the processing machine,
a digital counter for counting the pulses from said output pulse generating means, said digital counter having reset means,
a count gate means in circuit with said digital counter and said output pulse generating means for controlling the admission of pulses from said output pulse generating means to said digital counter,
a reset gate in circuit with said digital counter for controlling the application of reset signals to said reset means, and
cyclic timing means in circuit with said input pulse generating means and with said count gate and reset gate respectively, said timing means being controlled by the pulses from said input generator for opening and closing said count gate and said reset gate periodically to admit pulses from said output pulse generator to said digital counter through said count gate during a count accumulation period and to reset said digital counter at a predetermined period after said count accumulation period,
said reset gate requiring two simultaneously applied reset gate opening signals to open, and wherein said timing means including:
a first cyclic counting means for counting the pulses from said input pulse generator and delivering, after a predetermined number of input pulses have been counted, a first reset gate opening signal to said reset gate and a count transfer pulse,
a second cyclic counting means for counting the count transfer pulses from said first cyclic counting means and delivering on receipt of a first transfer pulse at beginning of each cycle, a signal to said count gate for opening said count gate and holding the count gate open until another transfer pulse is received, and on receipt of a predetermined number of transfer pulses after said first transfer pulse delivering a second reset gate opening signal to said reset gate,
said first and second cyclic counting means being automatically reset to begin a new counting cycle after receipt of said predetermined number of input pulses and said predetermined number of transfer pulses respectively.

2. The apparatus set forth in claim 1 wherein said cyclic counting means are ring counters.

3. The apparatus set forth in claim 1 wherein said digital counter includes multiple counting stages, each stage comprising a visual display counting tube, and in addition to the apparatus set forth in claim 1, means for blanking said counting tubes during said count accumulation period.

4. The apparatus set forth in claim 1 wherein there are plural input pulse generating means, each sampling material entering a process machine from a different one of a plurality of material sources, input gates for each input pulse generating means in circuit with respective pulse generating means and said cyclic time means, and an automatic selectable input scaler means controlled by said reset gate for sequentially gating a different one of said input gates to an open condition each time said reset gate is opened to permit pulses from the impulse generator which is connected to the open gate to pass through said gate to said cyclic timer means.

5. The apparatus set forth in claim 4 together with manual means for cutting one or more of said input gates out of the sampling sequence of said automatic selectable input scaler.

6. The apparatus set forth in claim 5 together with indicator lamps which indicate which of said input gates are still connected in the cycling sequence of said automatic selectable input scaler.

7. The apparatus set forth in claim 1 in combination with a speed time base oscillator and mode selecting means for applying pulses from said time base oscillator or said input generator means to said cyclic timer means so that said digital computer will compute either the speed of said process material leaving said processing machine or the percent elongation of said material being treated in said processing machine depending on whether pulses from the input pulse generataing means on said time base oscillator are applied to said cyclic timer means.

8. A digital computer for computing the percent elongation of material being treated in a processing machine comprising
 input pulse generating means for generating pulses corresponding to units of length of the material entering the processing machine,
 output pulse generating means for generating pulses corresponding to units of length of the material leaving the processing machine,
 a digital counter for counting the pulses from said output pulse generating means, said digital counter having reset means,
 a count gate means in circuit with said digital counter and said output pulse generating means for controlling the admission of pulses from said output pulse generating means to said digital counter,
 a reset gate in circuit with said digital counter for controlling the application of reset signals to said reset means, and
 cyclic timing means in circuit with said input pulse generatng means and with said count gate and reset gate respectively, said timing means being controlled by the pulses from said input generator for opening and closing said count gate and said reset gate periodically to admit pulses from said output pulse generator to said digital counter through said count gate during a count accumulation period and to reset said digital counter at a predetermined period after said count accumulation period,
 together with first integrating means in circuit between said input pulse generating means and said cyclic timing means for selectively increasing the time base over which said cyclic timing means operate by whole number multiples of one and with second integrating means in circuit with said digital counter for selectively dividing the count pulses being supplied to said digital counter by whole number factors corresponding to the whole number multiple selected for increasing said time base.

9. The apparatus set forth in claim 8 wherein said first and second integrating means include ring counters having multiple stages, and means for varying the number of stages function in said ring counters.

10. A digital computer for computing the percent elongation of material being treated in a processing machine comprising:
 input pulse generating means for generating pulses corresponding to units of length of the material entering the processing machine,
 output pulse generating means for generating pulses corresponding to suits of length of the material leaving the processing machine,
 a digital counter for counting the pulses from said output pulse generating means, said digital counter having reset means,
 a count gate means in circuit with said digital counter and said output pulse generating means for controlling the admission of pulses from said output pulse generating means to said digital counter,
 a reset gate in circuit with said digital counter for controlling the application of reset signals to said reset means, and
 cyclic timing means in circuit with said input pulse generating means and with said count gate and reset gate respectively, said timing means being controlled by the pulses from said input generator for opening and closing said count gate and said reset gate periodically to admit pulses from said output pulse generator to said digital counter through said count gate during a count accumulation period and to reset said digital counter at a predetermined period after said count accumulation period,
in combination with a speed time base oscillator and mode selecting means for applying pulses from said time base oscillator or said input generator means to said cyclic timer means so that said digital computer will compute either the speed of said process material leaving said processing machine or the percent elongation of said material being treated in said processing machine depending on whether pulses from the input pulse generating means on said time base oscillator are applied to said cyclic timer means, said mode selecting means including a stretch mode gate, a speed mode gate, a mode control switch, a three position function selecting switch, and a mode timing scaler means, said mode control switch being connected to said stretch mode gate, to said speed mode gate and to said function selecting switch and having two alternate operating conditions, first, where it supplies a turn-on signal to open said stretch mode gate and a turn-off signal to close said speed mode gate, and second, where it supplies a turn-off signal to close said stretch mode gate and a turn-on signal to open said speed mode gate, said function switch having a stretch position where it supplies a control signal to said mode control switch to establish said first operating condition, a speed position wherein it supplies a control signal to said mode control switch to establish said second condition, and a cycling position wherein it connects said mode timing scaler means having means to alternately and cyclically supply control signals to said mode control switch to alternately and cyclically establish said first and second operating conditions of said mode control switch.

11. The apparatus set forth in claim 10 together with means for supplying stepping pulses of a predetermined frequency to said mode timing scaler, said latter means being connected to said reset gate and controlled by reset pulses therefrom.

12. A digital computer for computing the speed of a moving web of material comprising:
 a time base generating means for generating pulses re-occurring at a predetermined frequency,
 output pulse generating means actuated in response to movement of said web of material providing pulses for each predetermined increment of movement of said web,
 a digital counter for counting the pulses from said output pulse generating means, said digital counter having reset means.
 a count gate means in circuit with said digital counter and said output pulse generating means for controlling the admission of pulses from said output pulse generating means to said digital counter,
 a reset gate in circuit with said digital counter for controlling the application of reset signals to said reset means, and
 cyclic timing means in circuit with said time base generating means and with said count gate and reset gate, respectively, said timing means being controlled by the pulses from said time base generating means for opening and closing said count gate and said reset gate periodically to admit pulses from said output pulse generating means to said digital counter through said count gate during a count accumulation period of duration equal to a predetermined time base unit of time, and to reset said digital counter at a predetermined period after said count accumulation period, said reset gate requiring two simultaneously applied reset gate opening signals to open, and said timing means including:

a first cyclic counting means for counting the pulses from said time base generating means and delivering, after a predetermined number of time base pulses have been counted, a first reset gate opening signal to said reset gate and a count transfer pulse, a second cyclic counting means for counting the count transfer pulses from said first cyclic counting means and delivering on receipt of a first transfer pulse at the beginning of each cycle, a signal to said count gate for opening said count gate and holding the count gate open until another transfer pulse is received and on receipt of a predetermined number of transfer pulses after said first transfer pulse, delivering a second reset gate opening signal to said reset gate, said first cyclic counting means being automatically reset to begin a new counting cycle after receipt of said predetermined number of time base pulses, and said second cyclic counting means being automatically reset to begin a new counting cycle after receipt of said predetermined number of transfer pulses.

13. The apparatus set forth in claim 12 wherein said first and second cyclic counting means are ring counters, said first cyclic timing means having counting stages corresponding to said predetermined number of time base pulses and said second cyclic counting means having counting stages corresponding to said predetermined number of transfer pulses.

14. The apparatus set forth in claim 13 wherein each stage of said ring counters include a silicon controlled switch having a cathode, a cathode gate, an anode and an anode gate, and each ring counter includes turn-on means for normally turning on the first stage, said stages being connected in cascade so that a first count pulse received by the ring counter will turn the first stage off, and turn the second stage on, and a second count pulse received by the ring counter will turn the second stage off and the third stage off, and so on until the count pulse corresponding in number with the number of stages of the ring counter is received which turns off the last stage of the ring counter and permits the turn-on means to turn the first stage on again to reset the ring counter for the beginning of a new cycle, the ring counter of said first cyclic counter having its last stage connected to the first stage of said second cyclic counter means, and to said reset gate, and said second cyclic counter having the output of its first stage connected to said count gate, and the output of its last stage connected to said reset gate.

15. The apparatus set forth in claim 12 wherein said digital counter includes multiple counting stages, each stage comprising a visual display counting tube and a counting scaler connected thereto, and in addition to the apparatus set forth in claim 12, means for blanking said counting tubes during said count accumulation period.

16. The apparatus set forth in claim 12 together with first integrating means in circuit between said time base generating means and said cyclic timing means for selectively increasing the time base over which said cyclic timing means operates by whole number multiples of one and with second integrating means in circuit with said digital counter for selectively dividing the count pulses being supplied to said digital counter by a whole number factor corresponding to the whole number multiple selected for increasing said time base.

17. The apparatus set forth in claim 16 wherein said first and second integrating means include ring counters having multiple stages, and means for varying the number of stages functioning in said ring counters.

References Cited

UNITED STATES PATENTS

| | | | |
|---|---|---|---|
| 2,922,940 | 1/1960 | Mergler | 318—162 |
| 3,039,685 | 6/1962 | Bagley et al. | 235—132 |
| 2,852,195 | 9/1958 | Coleman. | |
| 2,989,690 | 6/1961 | Cook. | |
| 3,139,236 | 6/1964 | Canova | 235—103.5 |
| 3,264,559 | 8/1966 | Eppler | 235—103.5 X |
| 3,267,372 | 8/1966 | Fritzsche | 235—103.5 X |

MAYNARD R. WILBUR, Primary Examiner

J. M. THESZ, Jr., Assistant Examiner

U.S. Cl. X.R.

324—68